(12) United States Patent
Takahashi et al.

(10) Patent No.: US 12,485,660 B2
(45) Date of Patent: Dec. 2, 2025

(54) SHEET SEPARATION DEVICE, SHEET LAMINATOR, IMAGE FORMING APPARATUS, AND IMAGE FORMING SYSTEM

(71) Applicants: Wataru Takahashi, Tokyo (JP); Tomohiro Furuhashi, Kanagawa (JP); Keisuke Sugiyama, Kanagawa (JP); Ruki Midorikawa, Kanagawa (JP); Shinya Monma, Kanagawa (JP); Sho Asano, Kanagawa (JP)

(72) Inventors: Wataru Takahashi, Tokyo (JP); Tomohiro Furuhashi, Kanagawa (JP); Keisuke Sugiyama, Kanagawa (JP); Ruki Midorikawa, Kanagawa (JP); Shinya Monma, Kanagawa (JP); Sho Asano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 277 days.

(21) Appl. No.: 18/060,256

(22) Filed: Nov. 30, 2022

(65) Prior Publication Data

US 2023/0202780 A1 Jun. 29, 2023

(30) Foreign Application Priority Data

Dec. 24, 2021 (JP) ................................. 2021-210760

(51) Int. Cl.
*B32B 37/00* (2006.01)
*B32B 37/14* (2006.01)
(Continued)

(52) U.S. Cl.
CPC ........ *B32B 37/0053* (2013.01); *B32B 37/142* (2013.01); *B65H 5/025* (2013.01);
(Continued)

(58) Field of Classification Search
CPC .......... B65H 3/06; B65H 3/04; B65H 3/0676; B65H 2404/262; B65H 2404/1532; B32B 37/0046; B32B 37/0053
See application file for complete search history.

(56) References Cited

U.S. PATENT DOCUMENTS

| 5,715,071 A * | 2/1998 | Takashimizu | ........ B65H 3/0669 358/492 |
| 7,559,549 B2 * | 7/2009 | Clark | ....................... B65H 5/34 271/270 |

(Continued)

FOREIGN PATENT DOCUMENTS

| CN | 102442561 A | 5/2012 |
| CN | 110282467 A | 9/2019 |

(Continued)

OTHER PUBLICATIONS

Extended European Search Report dated May 19, 2023 issued in corresponding European Appln. No. 22209995.4.

(Continued)

*Primary Examiner* — Patrick Cicchino
(74) *Attorney, Agent, or Firm* — Harness, Dickey & Pierce, P.L.C.

(57) ABSTRACT

A sheet separation device includes a sheet separator and a conveyor. The sheet separator separates a non-bonding portion of a two-ply sheet in which two sheets are overlapped and bonded together at a bonding portion of the two-ply sheet. The conveyor conveys the two-ply sheet toward the sheet separator while bending the two-ply sheet in a direction that intersects a conveyance direction of the two-ply sheet.

19 Claims, 17 Drawing Sheets

(51) Int. Cl.
*B65H 5/02* (2006.01)
*B65H 5/30* (2006.01)

(52) U.S. Cl.
CPC ...... *B65H 5/301* (2013.01); *B65H 2301/3113* (2013.01); *B65H 2301/51212* (2013.01); *B65H 2301/5133* (2013.01); *B65H 2403/411* (2013.01); *B65H 2403/942* (2013.01)

(56) References Cited

U.S. PATENT DOCUMENTS

| | | | |
|---|---|---|---|
| 7,992,858 B2* | 8/2011 | Sagawa | B65H 5/36 |
| | | | 271/10.01 |
| 8,794,626 B2* | 8/2014 | Takenaka | B65H 7/02 |
| | | | 271/262 |
| 2012/0080836 A1 | 4/2012 | Morisaki | |
| 2015/0360890 A1* | 12/2015 | Hwang | B65H 3/5269 |
| | | | 271/10.01 |
| 2019/0284009 A1 | 9/2019 | Suzuki et al. | |
| 2020/0247107 A1 | 8/2020 | Morinaga et al. | |
| 2020/0247636 A1 | 8/2020 | Furuhashi et al. | |
| 2020/0341414 A1* | 10/2020 | Watanabe | G03G 15/2028 |
| 2020/0361731 A1* | 11/2020 | Langrel | B65H 3/047 |
| 2021/0325804 A1 | 10/2021 | Furuhashi et al. | |
| 2021/0333730 A1 | 10/2021 | Asano et al. | |
| 2021/0347589 A1 | 11/2021 | Suzuki et al. | |
| 2022/0291620 A1 | 9/2022 | Fujita et al. | |

FOREIGN PATENT DOCUMENTS

| | | |
|---|---|---|
| CN | 111453477 A | 7/2020 |
| CN | 113552788 A | 10/2021 |
| JP | H06-321384 A | 11/1994 |
| JP | 2011-026047 A | 2/2011 |
| JP | 2020-121868 | 8/2020 |
| JP | 2020-121869 | 8/2020 |
| JP | 2021-169356 A | 10/2021 |
| JP | 2021176791 A | 11/2021 |

OTHER PUBLICATIONS

Office Action for Chinese Application No. 202211310848.5 dated Jul. 8, 2025.
Office Action for Japanese Application No. 2021-210760 dated Aug. 8, 2025.

* cited by examiner

FIG. 5A
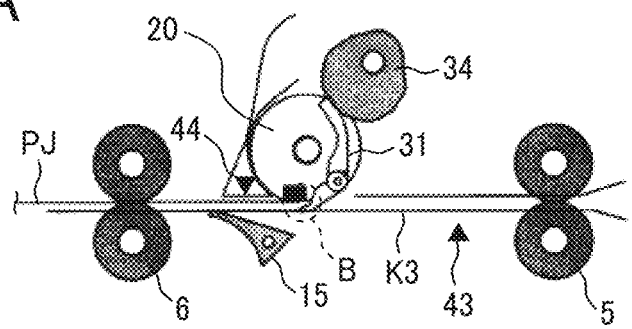
FIG. 5B
FIG. 5B'
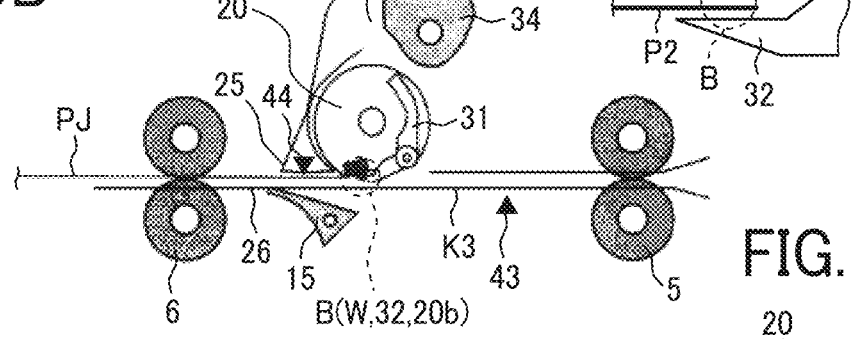
FIG. 5C
FIG. 5C'
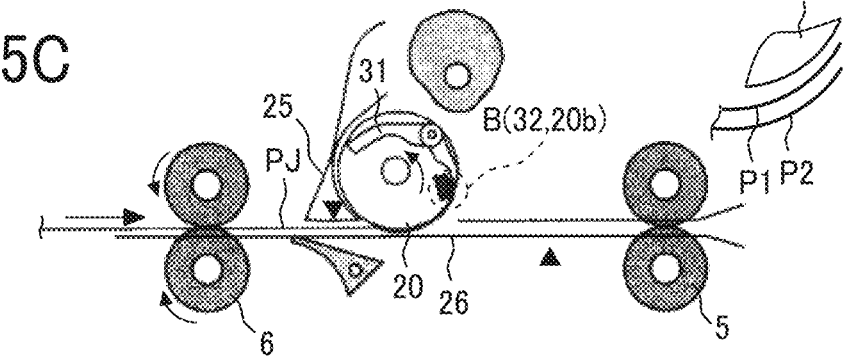
FIG. 5D
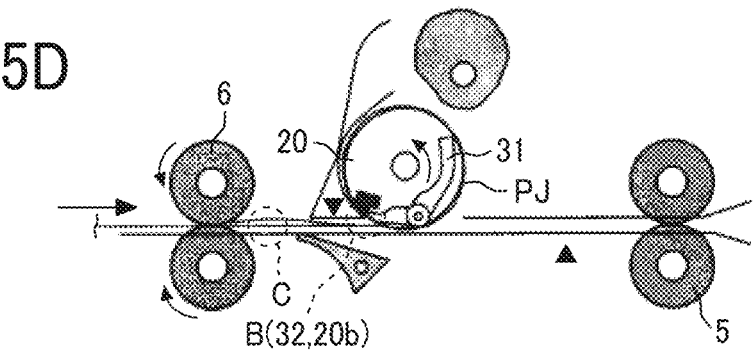

SHEET SEPARATION DEVICE, SHEET LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-210760, filed on Dec. 24, 2021, in the Japan Patent Office, the entire disclosure of which is hereby incorporated by reference herein.

BACKGROUND

Technical Field

Embodiments of the present disclosure relate to a sheet separation device to separate the non-bonding portion of a two-ply sheet in which two sheets are overlapped and bonded together at the bonding portion of the two-ply sheet, a sheet laminator including the sheet separation device, an image forming apparatus including the sheet separation device, and an image forming system including the sheet separation device. The image forming apparatus may be a copier, a printer, a facsimile machine, and a multi-functional apparatus having at least two functions of the copier, the printer, and the facsimile machine.

Background Art

Various types of sheet separation devices are known to separate a two-ply sheet in which two sheets are overlapped and bonded together at a bonding portion on one end of the two-ply sheet.

Specifically, a sheet separation device in the related art separates two sheets of a laminated sheet (e.g., a two-ply sheet) in which one sides of the two sheets are bonded at one end of the laminated sheet, and inserts a protective paper (e.g., an inner sheet) between the two sheets.

SUMMARY

Embodiments of the present disclosure described herein provide a novel sheet separation device includes a sheet separator and a conveyor. The sheet separator separates a non-bonding portion of a two-ply sheet in which two sheets are overlapped and bonded together at a bonding portion of the two-ply sheet. The conveyor conveys the two-ply sheet toward the sheet separator while bending the two-ply sheet in a direction that intersects a conveyance direction of the two-ply sheet.

Further, embodiments of the present disclosure described herein provide a sheet laminator including the above-described sheet separation device, and a sheet lamination device configured to perform a sheet laminating operation on the two-ply sheet in which an inner sheet is inserted between the two sheets separated from each other by the sheet separation device.

Further, embodiments of the present disclosure described herein provide an image forming apparatus including an image forming device to form an image on a sheet, and the above-described sheet laminator.

Further, embodiments of the present disclosure described herein provide an image forming system including an image forming apparatus to form an image on a sheet, and the above-described sheet laminator. The sheet laminator is detachably attached to the image forming apparatus.

Further, embodiments of the present disclosure described herein provide an image forming apparatus including an image forming device to form an image on a sheet, and the above-described sheet separation device.

Further, embodiments of the present disclosure described herein provide an image forming system including an image forming apparatus to form an image on a sheet, and the above-described sheet separation device. The sheet separation device is detachably attached to the image forming apparatus.

BRIEF DESCRIPTION OF THE SEVERAL VIEWS OF THE DRAWINGS

Exemplary embodiments of this disclosure will be described in detail based on the following figures, wherein:

FIGS. 5A, 5B, 5B', 5C, 5C', and 5D are schematic views of the sheet separation device, each illustrating the sheet separating operation performed in the sheet separation device, subsequent from the sheet separating operation of FIGS. 4A, 4B, 4C, and 4D;

Figure 1:
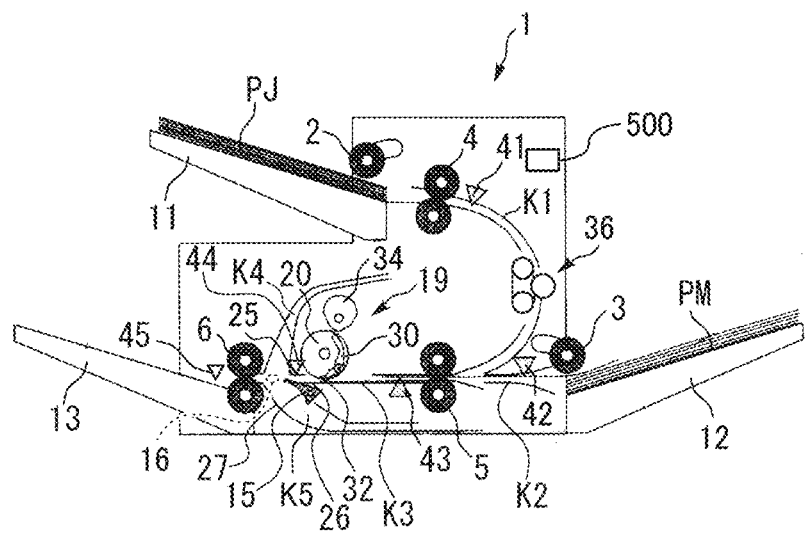
FIG. 1 is a schematic diagram illustrating an overall configuration of a sheet separation device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a sheet separation device, a sheet laminator, an image forming apparatus, and an image forming system, according to embodiments of the present disclosure, with reference to the drawings. Identical parts or equivalents are given identical reference numerals and redundant descriptions are summarized or omitted accordingly.

A description is given of the overall configuration and operations of a sheet separation device 1, with reference to FIG. 1.

FIG. 1 is a schematic diagram illustrating an overall configuration of the sheet separation device 1 according to an embodiment of the present disclosure.

Figure 4A:
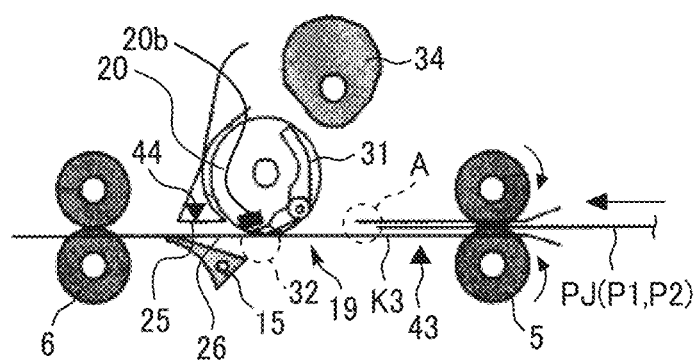
FIGS. 4A, 4B, 4C, and 4D are schematic views of the sheet separation device, each illustrating the sheet separating operation performed in the sheet separation device illustrated in FIG. 1.

The sheet separation device 1 includes a sheet separator 19 that separates the non-bonding portion of a two-ply sheet PJ in which two sheets, which are a first sheet P1 and a second sheet P2, are overlapped and bonded together at a bonding portion A of the two-ply sheet PJ (see FIG. 4A).

The sheet separator 19 performs the sheet separating operation and the sheet inserting operation. To be more specific, the sheet separator 19 performs the sheet separating operation to separate the non-bonding portion of the two-ply sheet PJ. The sheet separator 19 then performs the sheet inserting operation to insert the inner sheet PM between the first sheet P1 and the second sheet P2 separated from each other in the sheet separating operation.

In particular, in the present embodiment, the two-ply sheet PJ is made of the first sheet P1 and the second sheet P2 overlapped and bonded together at one side of the four sides as the bonding portion A. In other words, in the two-ply sheet PJ including the first sheet P1 and the second sheet P2, one side (the bonding portion A) of the first sheet P1 and one side (the bonding portion A) of the second sheet P2 are bonded (attached) by, e.g., thermal welding, and the other side of the first sheet P1 and the other side of the second sheet P2 are not bonded (attached). As the first sheet P1 and the second sheet P2 of the two-ply sheet PJ, a transparent film sheet (that is, a laminated sheet) may be employed.

The two-ply sheet PJ may be made by folding a single sheet. In the present disclosure, the two-ply sheet PJ made by folding a single sheet is also defined as the two sheets overlapped, a folded portion of the folded single sheet is defined as the "bonding portion", and the other portions are defined as the "non-bonding portion" or the "non-bonding portions".

The sheet separator 19 separates the non-bonding portion of the two sheets P1 and P2 of the two-ply sheet PJ between the winding roller 20 and the third conveyance roller pair 6, in other words, separates the two sheets P1 and P2 of the two-ply sheet PJ around the bonding portion A that maintains bonding of the first sheet P1 and the second sheet P2. Subsequently, the sheet separator 19 (of the sheet separation device 1) performs an operation in which the inner sheet PM is inserted between the separated two sheets, which are the first sheet P1 and the second sheet P2 of the two-ply sheet PJ. The inner sheet PM is a sheet such as one plain sheet.

As illustrated in FIG. 1, the sheet separation device 1 includes the sheet separator 19, a first feed tray 11, a second feed tray 12, a first feed roller 2, a second feed roller 3, a first conveyance roller pair 4, a second conveyance roller pair 5, a third conveyance roller pair 6, a curved conveyor 36 functioning as a conveyor, an ejection tray 13, a first sensor 41, a second sensor 42, a third sensor 43, a fourth sensor 44, a fifth sensor 45, a first guide 25 functioning as an inner restriction member, a second guide 26 functioning as an outer restriction member, and a third guide 27. The sheet separation device 1 further includes a controller 500 that controls sheet conveyance of the sheet (i.e., the two-ply sheet PJ and the inner sheet PM) by performing, e.g., a sheet separating operation, a sheet laminating operation, and a sheet inserting operation. The controller 500 is connected to various drivers driving various parts and units, for example, the above-described parts and units included in the sheet separation device 1.

The sheet separator 19 further includes a winding roller 20, a moving mechanism 30, switching claws 15, and separation claws 16.

The sheet separation device 1 further includes a plurality of sheet conveyance passages such as a first sheet conveyance passage K1 (curved conveyance passage), a second sheet conveyance passage K2, a third sheet conveyance passage K3, a first branched sheet conveyance passage K4, and a second branched sheet conveyance passage K5. Each of the first sheet conveyance passage K1, the second sheet conveyance passage K2, the third sheet conveyance passage K3, the first branched sheet conveyance passage K4, and the second branched sheet conveyance passage K5 includes two conveyance guides (guide plates) facing each other to guide and convey the sheet such as the two-ply sheet PJ and the inner sheet PM.

To be more specific, the two-ply sheet PJ is stacked on the first feed tray 11. The first feed roller 2 feeds the uppermost two-ply sheet PJ on the first feed tray 11, to the first conveyance roller pair 4, and the first conveyance roller pair 4 conveys the two-ply sheet PJ along the first sheet conveyance passage K1.

Further, the inner sheet PM is stacked on the second feed tray 12. Then, the second feed roller 3 feeds the uppermost inner sheet PM on the second feed tray 12.

Each of the first conveyance roller pair 4, the second conveyance roller pair 5, and the third conveyance roller pair 6 includes a drive roller and a driven roller each having an elastic layer made of, for example, rubber formed on a core, and conveys the sheet nipped by the respective nip regions formed by the drive roller and the driven roller. The third sheet conveyance passage K3 is a passage from the second conveyance roller pair 5 to the third conveyance roller pair 6 and provided with the second conveyance roller pair 5, the winding roller 20, and the third conveyance roller pair 6 in this order from upstream to downstream in the sheet conveyance direction. In particular, the third conveyance roller pair 6 is rotatable in forward to convey the sheet in the forward direction or in reverse to convey the sheet in the reverse direction. The third conveyance roller pair 6 also functions as an ejection roller pair that ejects the sheet to the ejection tray 13.

Each of the first sensor 41, the second sensor 42, the third sensor 43, the fourth sensor 44, and the fifth sensor 45 functions as a sheet sensor employing a reflective photosensor that optically detects whether the sheet is present at the position of each sensor. The first sensor 41 is disposed at a position near the portion downstream from the first conveyance roller pair 4 in the sheet conveyance direction. The second sensor 42 is disposed at the position near a portion downstream from the second feed roller 3 in the sheet conveyance direction. The third sensor 43 is disposed at the position between the second conveyance roller pair 5 and the winding roller 20 and near a portion downstream from the second conveyance roller pair 5 in the sheet conveyance direction. The fourth sensor 44 is disposed at the position near a portion downstream from the winding roller 20 and upstream from the third conveyance roller pair 6 in the sheet conveyance direction. The fifth sensor 45 is disposed at the position downstream from the third conveyance roller pair 6 in the sheet conveyance direction.

In the present embodiment, the first sheet conveyance passage K1 is a curved conveyance passage provided with the curved conveyor 36 that functions as a conveyor. Details of the curved conveyor 36 are described below, with reference to FIGS. 13 and 14.

A description is given of the winding roller 20 with reference to FIGS. 2A, 2B, 3A, 3B, 5B, 5B', 5C, 5C', 5D, and 6A.

Figure 2A:
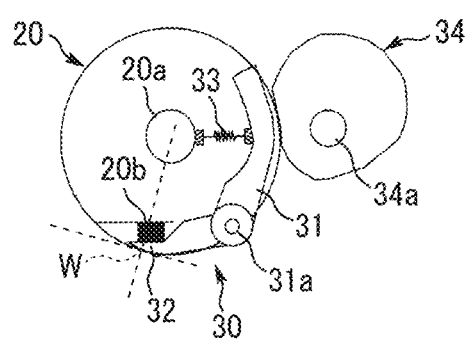
FIG. 2A is a side view of a gripper that has moved to a gripping position in the sheet separation device illustrated in FIG. 1

FIG. 2A is a side view of a gripper 32 that has moved to a gripping position in the sheet separation device 1 illustrated in FIG. 1.

Figure 2B:
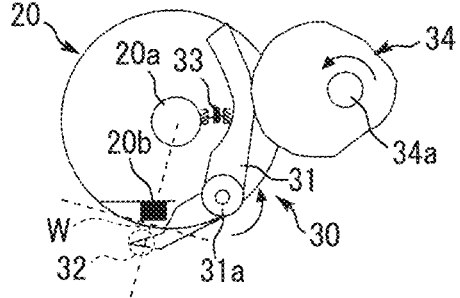
FIG. 2B is a side view of the gripper that has moved to a releasing position in the sheet separation device illustrated in FIG. 1.

FIG. 2B is a side view of the gripper 32 that has moved to a releasing position in the sheet separation device 1 illustrated in FIG. 1.

Figure 3A:
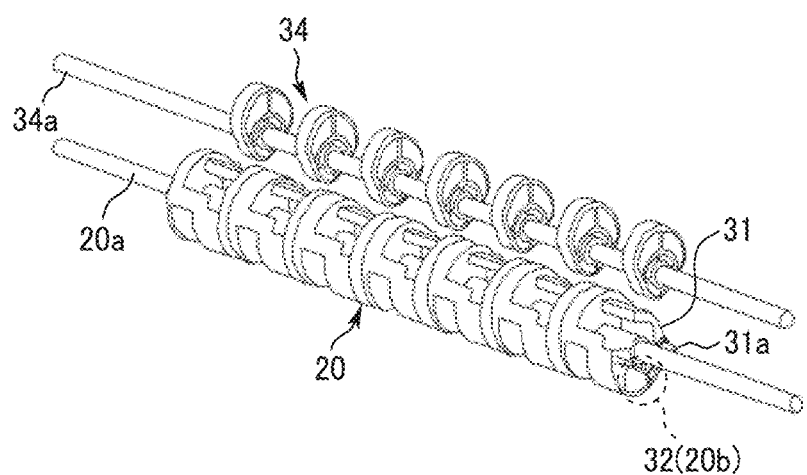
FIG. 3A is a perspective view of the gripper that has moved to the gripping position in the sheet separation device illustrated in FIG. 1.

FIG. 3A is a perspective view of the gripper 32 that has moved to the gripping position in the sheet separation device 1 illustrated in FIG. 1.

Figure 3B:
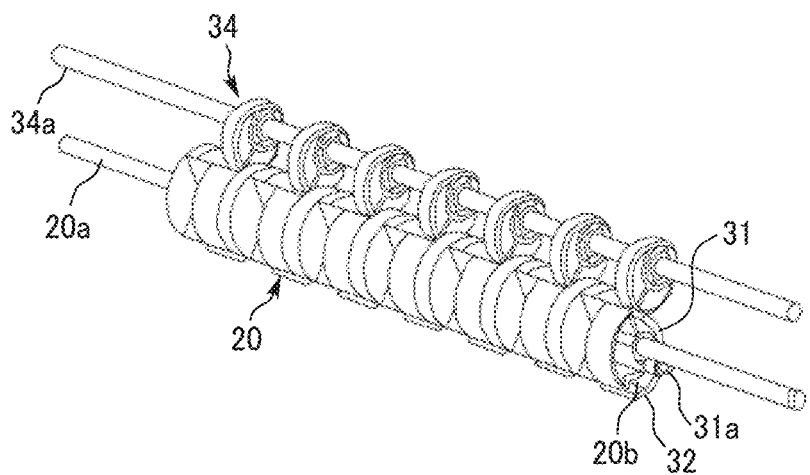
FIG. 3B is a perspective view of the gripper that has moved to the releasing position in the sheet laminator illustrated in FIG. 1.

FIG. 3B is a perspective view of the gripper 32 that has moved to the releasing position in the sheet separation device 1 illustrated in FIG. 1.

FIGS. 4A, 4B, 4C, and 4D are schematic views of the sheet separation device 1, each illustrating the sheet separating operation performed in the sheet separation device 1 illustrated in FIG. 1.

FIGS. 5A, 5B, 5B', 5C, 5C', and 5D are schematic views of the sheet separation device 1, each illustrating the sheet separating operation performed in the sheet separation device 1, subsequent from the sheet separating operation of FIGS. 4A, 4B, 4C, and 4D.

Figure 6A:
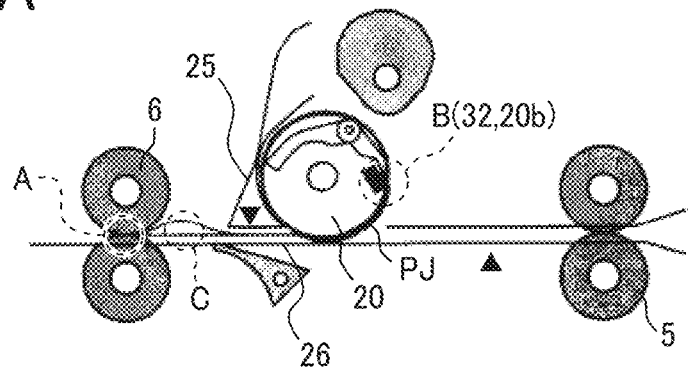
FIGS. 6A, 6B, and 6C are schematic views of the sheet separation device, each illustrating the sheet separating operation performed in the sheet separation device, subsequent from the sheet separating operation of FIGS. 5A, 5B, 5B', 5C, 5C', and 5D.
Figure 6B:
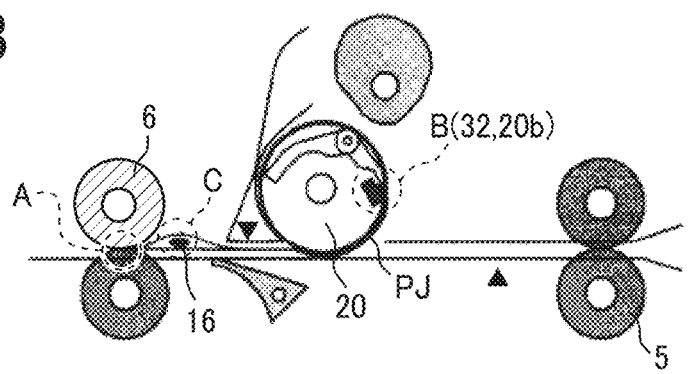
Figure 6C:
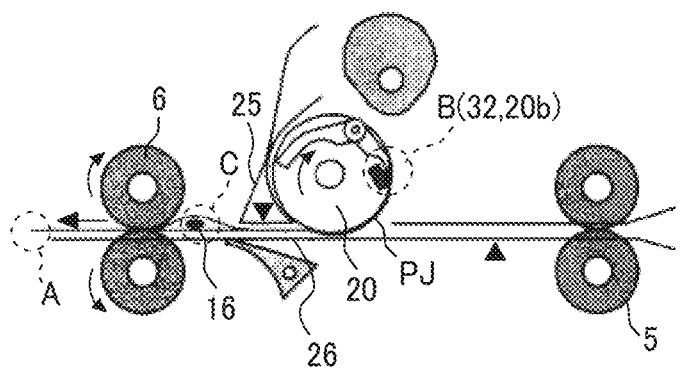

FIGS. 6A, 6B, and 6C are schematic views of the sheet separation device 1, each illustrating the sheet separating operation performed in the sheet separation device 1, subsequent from the sheet separating operation of each of FIGS. 5A, 5B, 5B', 5C, 5C', and 5D.

The winding roller 20 is a roller that winds the two-ply sheet PJ, with the gripper 32 that functions as a gripper (handle) gripping a gripped portion B of the two-ply sheet PJ at a winding start position W. The gripped portion B is an end of the two-ply sheet PJ that is opposite to an end at which the bonding portion A is formed, which is referred to as the other end of the two-ply sheet PJ. While the gripper 32 grips the gripped portion B of the two-ply sheet PJ, the winding roller 20 rotates in a given rotation direction to wind the two-ply sheet PJ around the winding roller 20. The winding roller 20 is rotatable around a rotary shaft 20a in the forward direction and in the reverse direction. The controller 500 controls a drive motor that drives the winding roller 20.

To be more specific, as illustrated in FIG. 1, the two-ply sheet PJ starts from the first feed tray 11 and passes through the first sheet conveyance passage K1, and the second conveyance roller pair 5 conveys the two-ply sheet PJ in the forward direction along the third sheet conveyance passage K3. The two-ply sheet PJ passes through the winding start position W of the winding roller 20 once and is conveyed to a position of the third conveyance roller pair 6.

Thereafter, the third conveyance roller pair 6 rotates in the reverse direction to convey the two-ply sheet PJ in the reverse direction to the position of the winding roller 20, and the gripper 32 grips the other end (leading end) of the two-ply sheet PJ. The two-ply sheet PJ is further conveyed while the other end (leading end) of the two-ply sheet PJ is gripped by the gripper 32, and the winding roller 20 rotates in the counterclockwise direction in FIG. 1 to wind the two-ply sheet PJ around the winding roller 20.

With reference to FIG. 5C', as the winding roller 20 winds the two-ply sheet PJ, the linear velocity of the sheet P1 is proportional to the distance to the sheet P1 from the center of the winding roller 20 and the linear velocity of the sheet P2 is proportional to the distance to the sheet P2 from the center of the winding roller 20, so that the linear velocity of the surface of the winding roller 20 is proportional to the radius of the winding roller 20. Due to such a configuration, the sheet P1 is closer to the center of the winding roller 20 than the sheet P2 (positioned inside), and the linear velocity of the sheet P1 is lower than that of the sheet P2.

As a result, the sheet P1 that is conveyed before the sheet P2 is more likely to slacken than the sheet P2. As illustrated in FIGS. 5D and 6A, a gap C is formed between the first sheet P1 and the second sheet P2 at the bonding portion A (the other end) of the two-ply sheet PJ, in other words, the gap C is formed as the first sheet P1 located upper than the second sheet P2 bends upward. As described above, the first sheet P1 and the second sheet P2 that are in close contact with each other without any gap are separated from each other.

A description is further given of a mechanism that generates the gap C in the two-ply sheet PJ between the winding roller 20 and the third conveyance roller pair 6 by winding the two-ply sheet PJ around the winding roller 20.

The two-ply sheet PJ wound around the winding roller 20 is gripped by the gripper 32, restricting misalignment in the sheet. Due to this configuration, a slip is generated between the first sheet P1 and the second sheet P2 by the amount of the circumferential length of the winding roller 20. Due to the slip, the conveyance amount of the inner sheet (i.e., the first sheet P1) is smaller than the conveyance amount of the outer sheet (i.e., the second sheet P2). As a result, slack is generated in the inner sheet (i.e., the first sheet P1) between the nip region of the third conveyance roller pair 6 and the winding roller 20.

At this time, as the two-ply sheet PJ is wound around the winding roller 20 by one or more rounds, the difference in the winding circumferential length is generated between the inner circumference and the outer circumference by the thickness of the sheet. As a result, the slack is additionally generated.

Finally, the slack is collected between the third conveyance roller pair 6 and the winding roller 20, and the clearance C is formed between the two sheets P1 and P2.

To be more specific, a distance from the rotary shaft 20a (i.e., the axial center) of the winding roller 20 to the second sheet P2 on the outer side of the winding roller 20 is R+ΔR, where a distance from the rotary shaft 20a (i.e., the axial center) of the winding roller 20 to the first sheet P1 on the inner side of the winding roller 20 is "R" and the thickness of the inner sheet (first sheet P1) is "ΔR". Since the radius of the first sheet P1 wound around the inner side of the winding roller 20 and the radius of the second sheet P2 wound around the outer side of the first sheet P1 are different by the thickness ΔR of the first sheet P1 (wound around the inner side of the winding roller 20), a circumferential length difference of 2×ΔR×π is generated between the inner sheet (first sheet P1) and the outer sheet (second sheet P2) when the two-ply sheet PJ is wound around the winding roller 20 by one round. As a result, when the number of winding the two-ply sheet PJ around the winding roller 20 is M times, the slack of the inner sheet (first sheet P1) is generated by the circumferential length difference of 2×ΔR×π×M.

Finally, the slack is accumulated between the third conveyance roller pair 6 and the winding roller 20, and the gap C corresponding to 2×ΔR×π×M is formed between the first sheet P1 and the second sheet P2.

Particularly in the present embodiment, in order to significantly form the gap C as described above, the two-ply sheet PJ is wound around the winding roller 20 at least one round.

As described above, in the present embodiment, by providing the winding roller 20 to wind the two-ply sheet PJ around the rotary shaft 20a, the two-ply sheet PJ is separatable without increasing the size and cost of the sheet separation device 1.

As illustrated in FIG. 5B', the gripper 32 illustrated in FIG. 2A in the present embodiment grips the gripped portion B of the two-ply sheet PJ without contacting the leading end face of the one end of the two-ply sheet PJ (the one end proximate to the gripped portion B).

In the present disclosure, the "end face" of the two-ply sheet is defined as a side face extending in the thickness direction and connecting the front face and the back face of the two-ply sheet. Accordingly, there are four end faces of the rectangular two-ply sheet on the front, back, left, and right.

To be more specific, the gripper 32 nips and grips the gripped portion B of the two-ply sheet PJ in a direction orthogonal to the sheet surface of the gripped portion B of the two-ply sheet PJ between the gripper 32 and a receiving portion 20b of the winding roller 20 without causing any member to contact the end face of the one end of the two-ply sheet PJ, in other words, without causing any member to hit or contact the end face of the two-ply sheet PJ. The receiving portion 20b of the winding roller 20 is a part of the outer circumferential portion of the winding roller 20 and is arranged to face the gripper 32. To be more specific, the receiving portion 20b is in a portion recessed inward from a virtual outer circumferential face of the winding roller 20. The virtual outer circumferential face is an outer circumferential face having a circular shape around which the two-ply sheet PJ is wound.

To be more specific, the two-ply sheet PJ is not nipped and gripped by the gripper 32 and the receiving portion 20b of the winding roller 20 by being restricted when a specific member such as the gripper 32 contacts the end face of the one end (that is the leading end face). The two-ply sheet PJ is nipped and gripped by the gripper 32 and the receiving portion 20b while the end face of the one end (leading end face) does not contact any member. At this time, the gripper 32 is located close to the second sheet P2 on the outer side to the center of the winding roller 20 and the receiving portion 20b is located close to the first sheet P1 on the inner side to the center of the winding roller 20.

Accordingly, the gripped portion B of the one end (leading end face) of the two-ply sheet PJ is gripped by the gripper 32 and the receiving portion 20b of the winding roller 20 and the end face (leading end face) of the one end of the two-ply sheet PJ does not contact an obtuse angle portion (wedge portion) of the gripper 32 in FIG. 5B'.

Without contacting any member, the end face (leading end of) of the one end of the two-ply sheet PJ coincides with an end of a contact face of the receiving portion 20b at which the gripper 32 contacts the receiving portion 20b via the two-ply sheet PJ, that is, the right end of the contact face in FIG. 5B'.

The end face (leading end face) of the one end of the two-ply sheet PJ may move to the right end of the contact face in FIG. 5B' beyond the contact surface between the gripper 32 and the receiving portion 20b so that the gripped portion B is inside the sheet from the leading end of the one end, that is, the portion proximate to the other end from the leading end of the one end. Alternatively, the end face (leading end face) of the one end of the two-ply sheet PJ may be on a left point of the contact face from the right end of the contact face in FIG. 5B'.

Accordingly, when compared with a configuration in which the leading end face of the two-ply sheet PJ contacts a member, the above-described structure according to the present embodiment can reduce damage on the two-ply sheet PJ (particularly, the leading end).

In the present embodiment, the bonding portion A of the two-ply sheet PJ wound around the winding roller 20 is the one end of the two-ply sheet PJ. The other end is opposite to the one end functioning as the gripped portion B.

In the present embodiment, at least the gripper 32 (handle) or the receiving portion 20b is made of elastic material such as rubber, spring, or leaf spring.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, when the gripper 32 and the receiving portion 20b included in the sheet separation device 1 are made of the elastic material, the sheet separation device 1 can easily achieve the above-described effect.

As illustrated in FIGS. 2A, 2B, 3A, and 3B, the moving mechanism 30 moves the gripper 32 at the winding start position W of the winding roller 20 between a gripping position (position illustrated in FIGS. 2A and 3A) at which the gripper 32 can grip the two-ply sheet PJ and a releasing position (position illustrated in FIGS. 2B and 3B) at which the gripper 32 is released from the gripping position.

Specifically, the moving mechanism 30 includes an arm 31, a compression spring 33, a cam 34, and a motor. The compression spring 33 functions as a biasing member. The motor drives to rotate the cam 34 in the forward direction or the reverse direction.

The arm 31 holds the gripper 32 and is held by the winding roller 20 to be rotatable together around a support shaft 31a. In the present embodiment, the gripper 32 is coupled to the base of the arm 31, in other words, the tip of the arm 31, and the gripper 32 and the arm 31 are made (held) as a single unit. Alternatively, the gripper 32 and the arm 31 may be made as separate members, and the gripper 32 may be mounted on the arm 31, that is, may be held by the arm 31. In any case, the arm 31 holding the gripper 32 rotates around the rotary shaft 20a together with the winding roller 20 together with the gripper 32.

The compression spring 33 functions as a biasing member that biases the arm 31 so that the gripper 32 moves from the releasing position illustrated in FIG. 2B to the gripping position illustrated in FIG. 2A. To be more specific, one end of the compression spring 33 is coupled to a fixed position near the rotary shaft 20a, and the other end of the compression spring 33 is coupled to one end of the arm 31 that is a free end opposite to the other end of the arm 31 coupled to the gripper 32 with respect to the support shaft 31a.

The cam 34 pushes the arm 31 against the biasing force of the compression spring 33 that functions as the biasing member, so that the gripper 32 moves from the gripping position illustrated in FIG. 2A to the releasing position illustrated in FIG. 2B. The motor that is controlled by the controller 500 drives the cam 34 to rotate in the forward direction or the reverse direction at a desired rotation angle. The cam 34 is held by the housing of the sheet laminator 50 so as to be rotatable around a cam shaft 34a separately from the winding roller 20.

In the moving mechanism 30 including the above-described configuration, as illustrated in FIGS. 2A and 3A, when the cam 34 is not in contact with the arm 31, the arm 31 is biased by the compression spring 33 to press the gripper 32 against the receiving portion 20b. This state is referred to as a closed state.

By contrast, as illustrated in FIGS. 2B and 3B, when the cam 34 contacts and presses the arm 31, the arm 31 rotates in the counterclockwise direction in FIG. 2B around the support shaft 31a against the biasing force of the compression spring 33, so that the gripper 32 separates from the receiving portion 20b. This state is referred to as an open state. In the open state, the two-ply sheet PJ is not gripped, which is referred to as a grip release state. When the gripper 32 is at the releasing position to be in the open state, the two-ply sheet PJ enters a space between the gripper 32 and the receiving portion 20b, and the gripper 32 moves to the gripping position to be in the closed state. As a result, the gripper 32 and the receiving portion 20b grip the two-ply sheet PJ.

In the present embodiment, as illustrated in FIGS. 3A and 3B, the winding roller 20 includes a plurality of roller portions (i.e., seven roller portions in the present embodiment) having a columnar shape and being disposed at given intervals in the axial direction of the winding roller 20. A plurality of grippers 32 and a plurality of arms 31 are disposed at divided positions between adjacent rollers, in other words, recesses between adjacent rollers, respectively. A plurality of cams 34 are disposed to be contactable to the plurality of arms 31, respectively.

Setting portions provided at given intervals in the axial direction to grip the two-ply sheet PJ as described above, that is, not setting the entire area of the winding roller 20 and the cam 34 in the axial direction to grip the two-ply sheet PJ can share load to grip the two-ply sheet PJ and can be scratch resistant at the leading end of the two-ply sheet PJ. The above-described configuration is useful when a gripping force required to grip the two-play sheet PJ increases, for example, when a large-sized two-ply sheet PJ or a heavy two-ply sheet PJ is gripped.

In this embodiment, as illustrated in FIG. 1, the third conveyance path K3 is made of linear conveyance guide plates. By contrast, the third conveyance path may be made of curved conveyance guide plates. In such a case, a gripping position at which the winding roller 20 grips the two-ply sheet PJ may be changed to be closer to the rotary shaft 20a than the gripping position in the present embodiment. Additionally, in such a case, the position of the gripper 32 in the present embodiment and the position of the receiving portion 20b in the present embodiment may be interchanged, so that the gripper 32 may be disposed closer to the rotary shaft 20a than the receiving portion 20b in the winding roller 20.

Figure 4B:
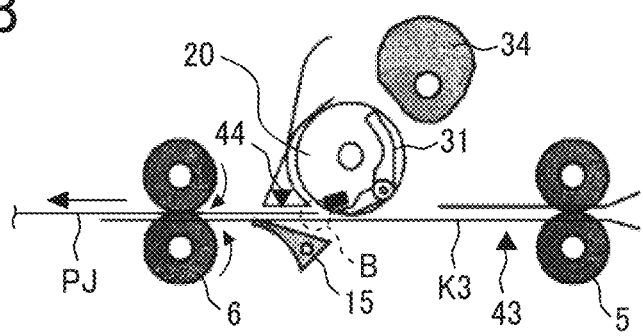
Figure 4C:
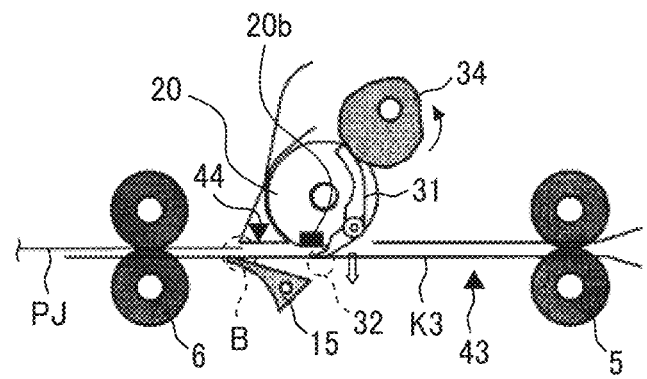
Figure 4D:
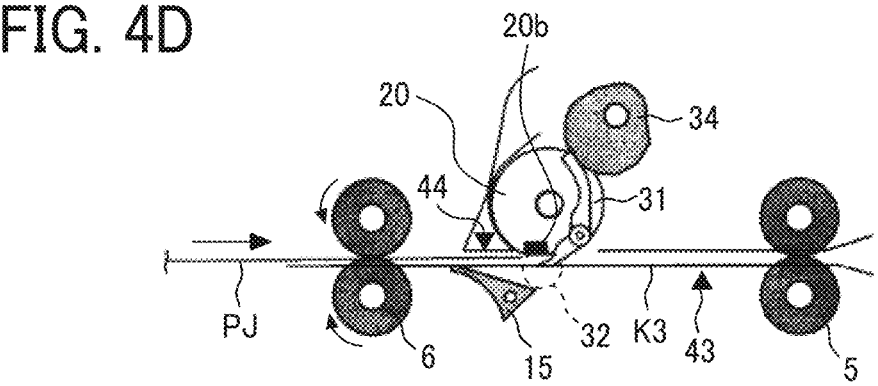

A description is given of the fourth sensor 44 provided for the sheet separation device 1 according to the present embodiment, with reference to FIGS. 1, 4D, and 5A. The fourth sensor 44 functions as a sheet detection sensor to detect the two-ply sheet PJ that is conveyed toward the winding roller 20. Based on the detection results of the fourth sensor 44 (sheet detection sensor), the controller 500 controls the moving mechanism 30.

To be more specific, the fourth sensor 44 is disposed on the conveyance guide in the sheet conveyance passage between the winding roller 20 and the third conveyance roller pair 6. As illustrated in FIGS. 4D and 5A, when the third conveyance roller pair 6 conveys the two-ply sheet PJ in the reverse direction toward the position of the winding roller 20 with the gripped portion B of the two-ply sheet PJ acting as the leading end, the fourth sensor 44 detects the leading end (that is, the leading end of the gripped portion B) of the two-ply sheet PJ conveyed in the reverse direction. In response to the detection timing at which the fourth sensor 44 detects the leading end (in the reverse direction) of one end of the gripped portion B, the controller 500 adjusts and controls the timing to stop the two-ply sheet PJ at the gripping position and the timing at which the gripper 32 grips the gripped portion B. Specifically, after a given time has passed from the detection of the front end of the two-ply sheet PJ by the fourth sensor 44, the third conveyance roller pair 6 stops conveyance of the two-ply sheet PJ in the reverse direction, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the end face of the two-ply sheet PJ is nipped by the gripper 32 and the receiving portion 20b without contacting the end face of the two-ply sheet PJ on any member.

As described above, the third conveyance roller pair 6 is a sheet conveying roller pair that conveys the two-ply sheet PJ with the one end (i.e., the gripped portion B) as a leading end, toward the winding start position W of the winding roller 20 in the third sheet conveyance passage K3 (sheet conveyance passage) between the third conveyance roller pair 6 and the winding roller 20.

A description is given of the separation claws 16 with reference to FIGS. 6A, 6B, 6C, 9, 10A, 10B, and 10C.

Figure 7A:
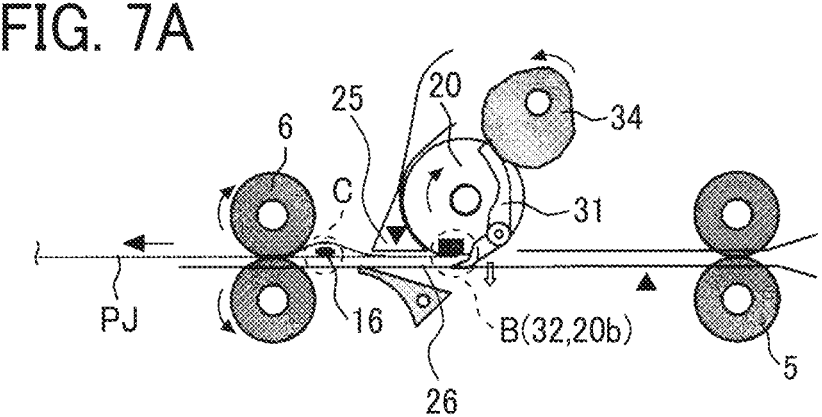
FIGS. 7A, 7B, and 7C are schematic views of the sheet separation device, each illustrating the sheet separating operation performed in the sheet separation device, subsequent from the sheet separating operation of FIGS. 6A, 6B, and 6C.
Figure 7B:
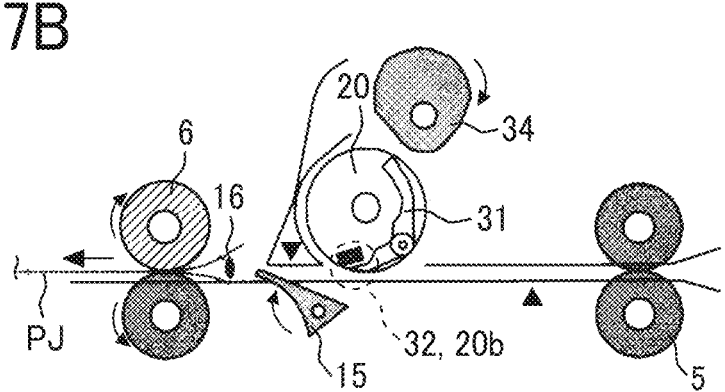
Figure 7C:
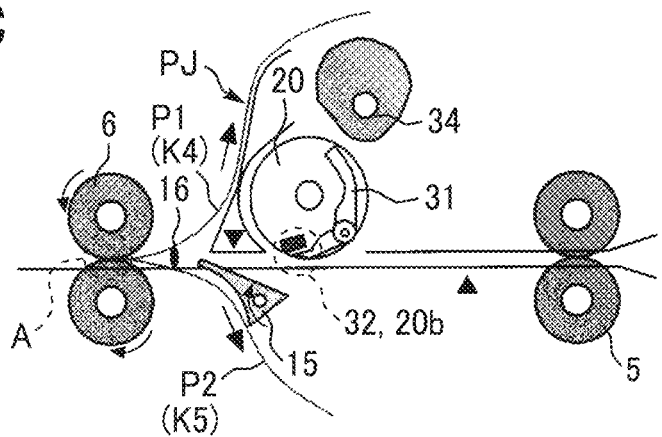

FIGS. 7A, 7B, and 7C are schematic views of the sheet separation device 1, each illustrating the sheet separating operation performed in the sheet separation device 1, subsequent from the sheet separating operation of FIGS. 6A, 6B, and 6C.

Figure 8A:
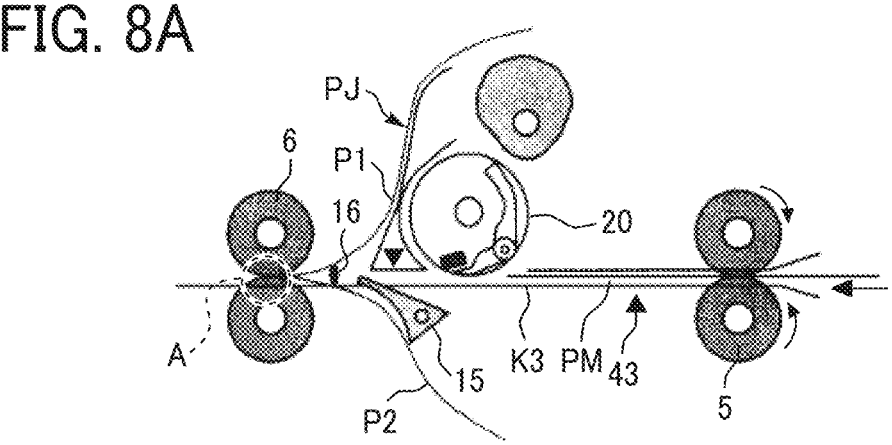
FIGS. 8A, 8B, and 8C are schematic views of the sheet separation device, each illustrating the sheet separating operation performed in the sheet separation device, subsequent from the sheet separating operation of FIGS. 7A, 7B, and 7C.
Figure 8B:
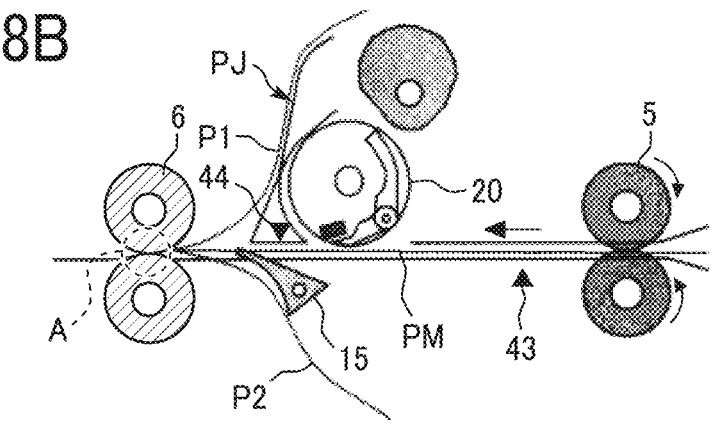
Figure 8C:
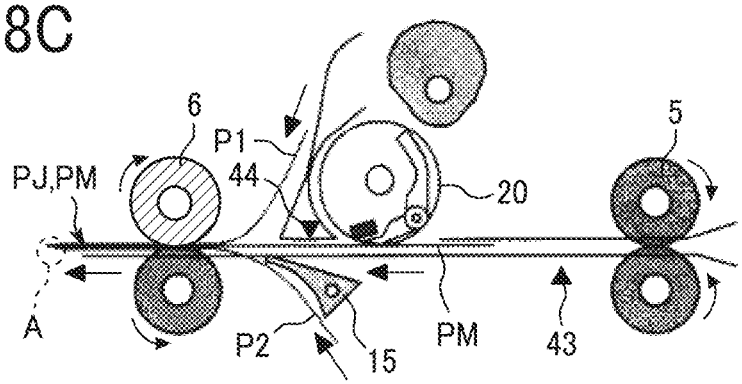

FIGS. 8A, 8B, and 8C are schematic views of the sheet separation device 1, each illustrating the sheet separating operation performed in the sheet separation device 1, subsequent from the sheet separating operation of FIGS. 7A, 7B, and 7C.

Figure 9:
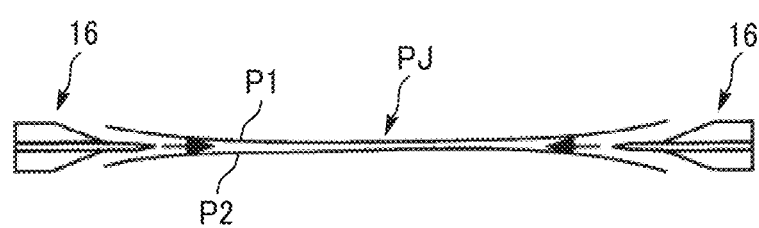
FIG. 9 is a schematic view of separation claws inserted into a two-ply sheet in a width direction of the two-ply sheet.

FIG. 9 is a schematic view of separation claws 16 inserted into a two-ply sheet in a width direction of the two-ply sheet.

Figure 10A:
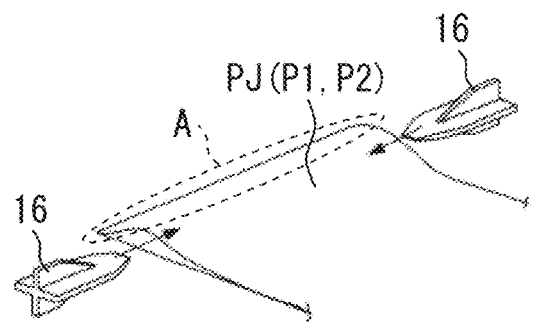
FIGS. 10A, 10B, and 10C are perspective views of the separation claws, each illustrating the operations of the separation claws in the width direction.
Figure 10B:
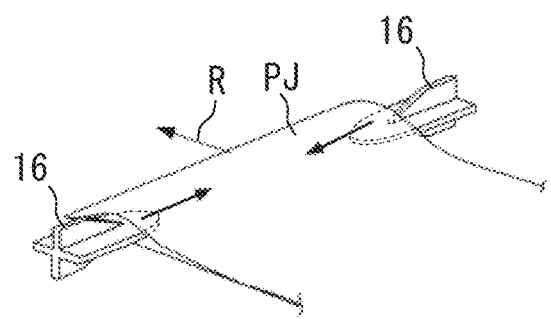
Figure 10C:
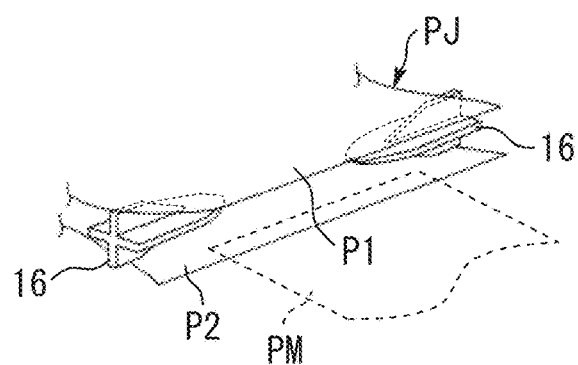

FIGS. 10A, 10B, and 10C are perspective views of the separation claws 16, each illustrating the operations of the separation claws 16 in the width direction.

The separation claws 16 are inserted into the gap C formed between the first sheet Pb and the second sheet P2 at a position between the winding roller 20 and the third conveyance roller pair 6 from the outside of both ends of the two-ply sheet PJ in the width direction of the two-ply sheet PJ, with respect to the two-ply sheet PJ when the one end (that is the gripped portion B) is wound by the winding roller 20 and the other end (that is the bonding portion A) is nipped by the third conveyance roller pair 6 (sheet conveying roller pair).

More specifically, in the present embodiment, the separation claws 16 are disposed at both ends of the two-ply sheet PJ in the width direction that is the direction perpendicular to a plane on which FIGS. 6A to 6C are illustrated and the horizontal direction in FIG. 9. The separation claws 16 have respective fins extending in the vertical direction from respective plates. In the direction in which the separation claws 16 are inserted into the two-ply sheet PJ, each of the respective plates has the rear end and the front end at the center in the width direction of the plates. The plate thickness and the plate width of each of the respective plates gradually increase from the front end to the rear end of the fin. The vertical length (length in the vertical direction) of the fin gradually increases from the front end of the fin in the direction in which the separation claw 16 is inserted into the two-ply sheet PJ. The fin and the plate in the separation claw 16 form a cross shape at the rear end of the fin (see FIG. 10A). Further, the separation claws 16 are movable in the width direction of the two-ply sheet PJ by a moving device controlled by the controller 500 so as not to contact with each other.

The separation claws 16 having the above-described configuration stand by at respective standby positions (see FIG. 10A) at which the separation claws 16 do not interfere with conveyance of the sheet such as the two-ply sheet PJ in the third sheet conveyance passage K3 until the gap C is formed between the two sheets (the first sheet P1 and the second sheet P2) as illustrated in FIG. 6A. Subsequently, as illustrated in FIGS. 9 and 10B, the separation claws 16 enter the gap C in the two-ply sheet PJ (between the first sheet P1 and the second sheet P2) when separating the two-ply sheet PJ. As a result, the separation claws 16 obtain the gap C to be a relatively large gap.

The moving device that moves the separation claws 16 in the width direction of the two-ply sheet PJ may employ, for example, a rack and pinion mechanism.

Figure 11A:
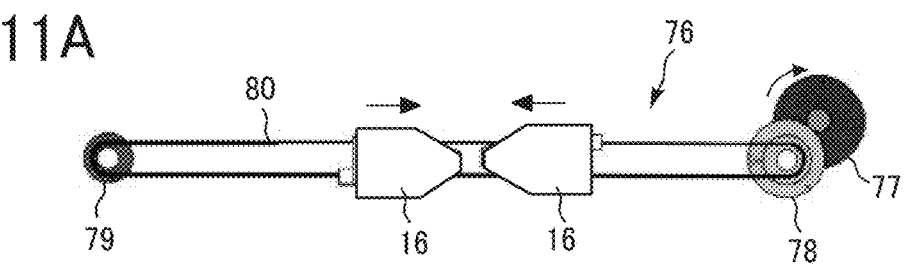
FIGS. 11A and 11B are schematic view of a driving mechanism to move the separation claws.
Figure 11B:
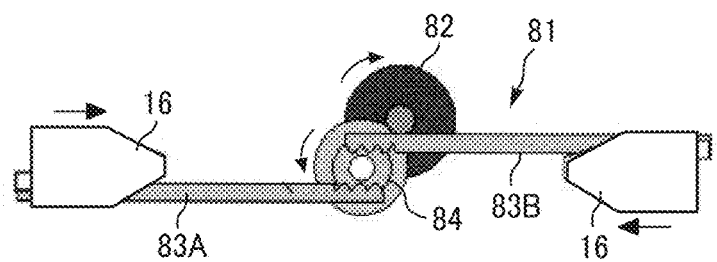

More specifically, the moving device that moves the pair of separation claws 16 in the width direction may employ a driving mechanism 76 as illustrated in FIG. 11A or FIG. 11B.

FIGS. 11A and 11B are schematic view of a driving mechanism to move the separation claws 16.

In the present embodiment, the two separation claws 16 are disposed facing each other, as illustrated in FIGS. 11A and 11B. The driving mechanism 76 illustrated in FIG. 11A moves the two separation claws 16 by a belt driving. On the other hand, the driving mechanism 76 illustrated in FIG. 11B moves the two separation claws 16 by a rack and pinion driving.

Specifically, the driving mechanism 76 illustrated in FIG. 11A includes a belt 80 stretched between a drive pulley 78 and a driven pulley 79 and the two separation claws 16 are attached to the belt 80 with facing each other. Of the two separation claws 16, one separation claw 16 is attached and connected to the lower part of the belt 80 and the other separation claw 16 is attached and connected to the upper part of the belt 80. The drive pulley 78 includes a drive gear that meshes with a motor gear mounted on the motor shaft of a drive motor 77. The rotational output of the drive motor 77 is transmitted to the belt 80. Specifically, as the motor gear of the drive motor 77 rotates in the clockwise direction in FIG. 11A, the two separation claws 16 approach toward each other. On the other hand, as the motor gear of the drive motor 77 rotates in the counterclockwise direction in FIG. 11A, the two separation claws 16 move away from each other.

The driving mechanism 76 illustrated in FIG. 11B includes two racks 83A and 83B extending in opposite directions from each other. Each of the racks 83A and 83B meshes with a single pinion 84. One separation claw 16 that is attached to the rack 83A faces the other separation claw 16 that is attached to the rack 83B. The pinion 84 includes a drive gear that meshes with a motor gear mounted on the motor shaft of a drive motor 82. The rotational output of the drive motor 82 is transmitted to the racks 83A and 83B. Specifically, as the motor gear of the drive motor 82 rotates in the clockwise direction in FIG. 11B, the two separation claws 16 approach toward each other. On the other hand, as the motor gear of the drive motor 77 rotates in the counterclockwise direction in FIG. 11B, the two separation claws 16 move away from each other.

As described above, each of the separation claws 16 of the present embodiment has the above-described shape having the plate and the fin extending in the vertical direction and is movable in the width direction of the two-ply sheet PJ due to the driving by the driving mechanism 76. Due to such a configuration, the separation claws 16 are smoothly inserted into the gap C generated in the two-ply sheet PJ as illustrated in FIG. 10B.

A description is given of the switching claws 15, with reference to FIGS. 7A, 7B, 7C, 8A, 8B, and 8C.

As illustrated in FIGS. 7A, 7B, and 7C, the switching claws 15 are disposed between the separation claws 16 and the winding roller 20. Note that the switching claws 15 may also be referred to in a singular form as the "switching claw 15" for convenience. The two-ply sheet PJ is separated into the two sheets, which are the first sheet P1 and the second sheet P2, by the separation claws 16, and the two sheets P1 and P2 of the two-ply sheet PJ having stiffness are guided to respective directions different from each other, specifically, to the first branched sheet conveyance passage K4 and the second branched sheet conveyance passage K5, respectively. The first branched sheet conveyance passage K4 and the second branched sheet conveyance passage K5 are branched from the third sheet conveyance passage K3 across the third sheet conveyance passage K3. The switching claw 15 is a claw-shaped moving member to rotate in forward or in reverse within a range of a predetermined angle to guide the two-ply sheet PJ.

More specifically, in the present embodiment, the switching claws 15 are spaced apart from each other in the width direction of the two-ply sheet PJ, in other words, in the direction perpendicular to a plane of the drawing sheets on which FIGS. 7A to 7C are illustrated. The switching claws 15 are rotatable around a support shaft by a drive unit controlled by the controller 500.

The switching claws 15 having the above-described configuration stand by at respective standby positions (see FIG. 7A) at which the switching claws 15 do not interfere with conveyance of the sheet such as the two-ply sheet PJ in the third sheet conveyance passage K3 until the first sheet P1 and the second sheet P2 of the two-ply sheet PJ separated by the separation claws 16 are guided to the first branched sheet conveyance passage K4 and the second branched sheet conveyance passage K5, respectively. When the switching claws 15 guide the two sheets P1 and P2 separated from the two-ply sheet PJ by the separation claws 16 to the first branched sheet conveyance passage K4 and the second branched sheet conveyance passage K5, respectively, in other words, in the directions different from each other, the switching claws 15 rotate to the positions at which the switching claws 15 prevent the two-ply sheet PJ from entering the third sheet conveyance passage K3 when viewed from the two-ply sheet PJ as illustrated in FIG. 7B.

As a result, the first sheet P1 is guided to the first branched sheet conveyance passage K4, and the second sheet P2 is guided to the second branched sheet conveyance passage K5.

As illustrated in FIG. 7A, after the separation claws 16 are inserted into the gap C, the third conveyance roller pair 6 conveys the two-ply sheet PJ to the other end (left side) so that the winding of the one end of the two-ply sheet PJ on the winding roller 20 is released. In other words, the controller 500 causes the third conveyance roller pair 6 to convey the two-ply sheet PJ toward the other end of the two-ply sheet PJ (i.e., the left side in FIG. 7A). After the two-ply sheet PJ has been conveyed as illustrated in FIG. 7B, the third conveyance roller pair 6 conveys the two-ply sheet PJ to the one end (right side) again as illustrated in FIG. 7C. Then, the sheet P1 that is one of the two sheets of the two-ply sheet PJ separated by the separation claws 16 is guided to the first branched sheet conveyance passage K4, and the sheet P2 that is the other of the two sheets of the two-ply sheet PJ is guided to the second branched sheet conveyance passage K5. Subsequently, as illustrated in FIGS. 8A, 8B, and 8C, the second conveyance roller pair 5 conveys the inner sheet PM to the other end of the third sheet conveyance passage K3 to insert the inner sheet PM between the first sheet P1 and the second sheet P2 separated from the two-ply sheet PJ.

The first guide 25 is included in the sheet separation device 1 according to the present embodiment, with reference to FIG. 6A. The first guide 25 is disposed between the separation claws 16 (see FIG. 6B) and the winding roller 20 in the third sheet conveyance passage K3. The first guide 25 functions as an inner restriction member to limit an amount of slack of the first sheet P1 that is wound around the winding roller 20 on the inner side, among the first sheet P1 and the second sheet P2 of the two-ply sheet PJ wound around the winding roller 20.

The second guide 26 is included in the sheet separation device 1 according to the present embodiment, with reference to FIG. 6A. The second guide 26 is disposed between the separation claws 16 (see FIG. 6B) and the winding roller 20 in the third sheet conveyance passage K3. The second guide 26 functions as an outer restriction member to limit an amount of slack of the second sheet P2 that is wound around the winding roller 20 on the outer side, among the first sheet P1 and the second sheet P2 of the two-ply sheet PJ wound around the winding roller 20, when the second sheet P2 is slackened due to rotational unevenness of the winding roller 20 or the third conveyance roller pair 6.

A description is given of the operations performed in the sheet separation device 1 (sheet separator 19) to separate the two-ply sheet PJ, with reference to FIGS. 4 to 8C.

Further, in the description of the operations, the operations of the separation claws 16 are appropriately described with reference to FIGS. 9, 10A, 10B, and 10C, and the control flow is described with reference to a flowchart of FIG. 12, that is, FIGS. 12A and 12B.

Figures 12, 12A, 12B:
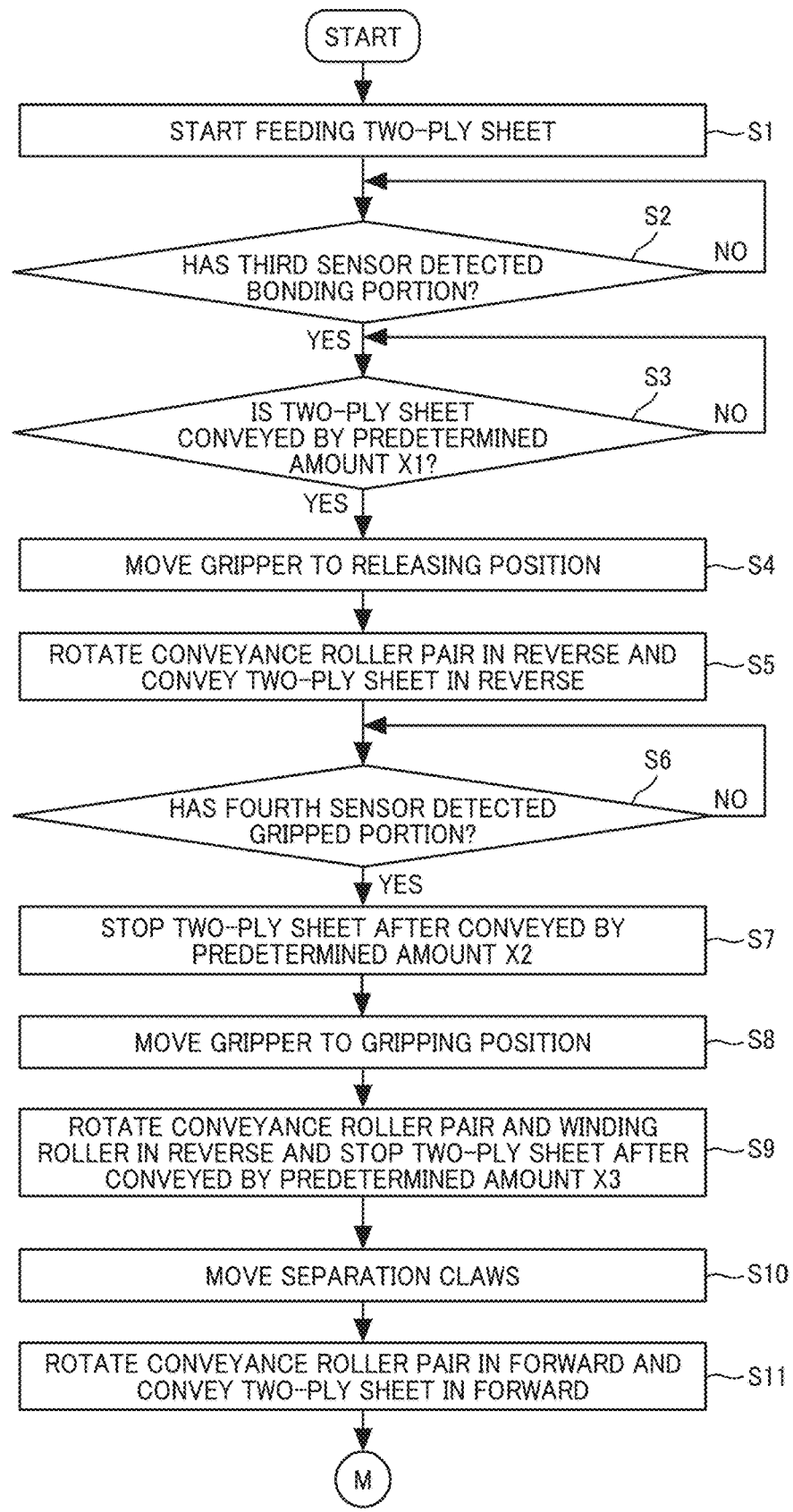
FIG. 12 including
FIGS. 12A and 12B is a flowchart illustrating the control process executed in the sheet separation device.
Figure 12B:
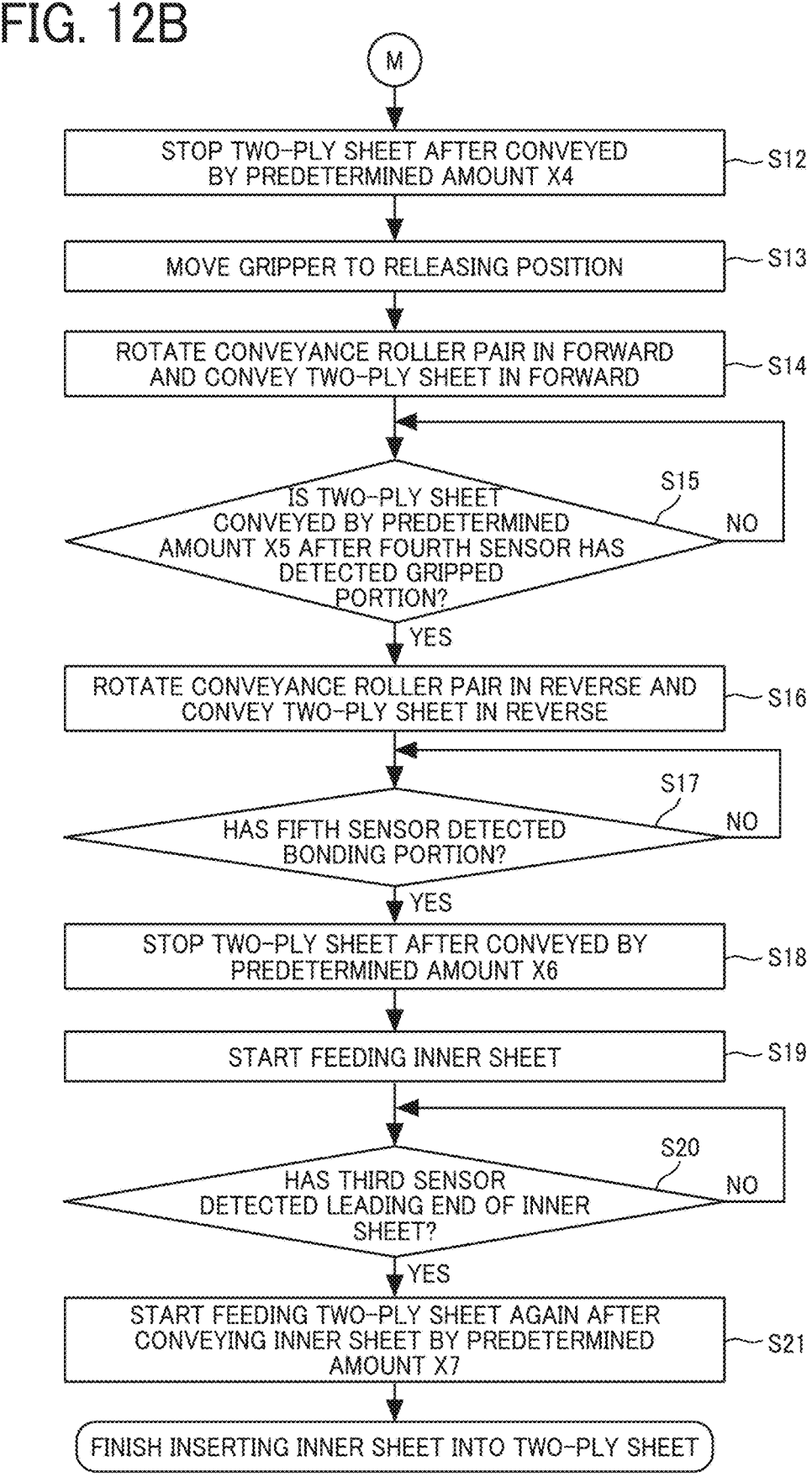

FIG. 12 including FIGS. 12A and 12B is a flowchart of the control process executed in the sheet separation device 1.

First, the first feed roller 2 and the first conveyance roller pair 4 start feeding the two-ply sheet PJ from the first feed tray 11 in step S1 of FIG. 12A. Then, as illustrated in FIG. 4A, the second conveyance roller pair 5 conveys the two-ply sheet PJ with the bonding portion A as the leading end of the two-ply sheet PJ in the forward direction that is a direction from the right side to the left side in FIGS. 4A to 4D in the third sheet conveyance passage K3.

At this time, the controller 500 causes the moving mechanism 30 to position the gripper 32 at the gripping position that is inside of the outer circumference of the winding roller 20. In other words, the cam 34 moves to a rotational position at which the cam 34 does not press the arm 31. When the gripper 32 is positioned at the gripping position as described above, the gripper 32 does not block conveyance of the sheet in the third sheet conveyance passage K3.

The switching claws 15 rotate the free end downward and stand by at the standby positions at which the switching claws 15 do not interrupt the conveyance of the sheet in the third sheet conveyance passage K3.

Then, as illustrated in FIG. 4B, the third conveyance roller pair 6 conveys the two-ply sheet PJ until the gripped portion B of the two-ply sheet PJ (i.e., the trailing end of the two-ply sheet PJ conveyed in the forward direction, in other words, the one end of the two-ply sheet PJ) passes through the position of the winding roller 20. After the two-ply sheet PJ is further conveyed in the forward direction, the third conveyance roller pair 6 stops the conveyance of the two-ply sheet PJ, as illustrated in FIG. 4C. Specifically, the controller 500 determines whether the third sensor 43 detects the bonding portion A of the two-ply sheet PJ (i.e., the leading end of the two-ply sheet PJ conveyed in the forward direction, that is, the other end of the two-ply sheet PJ) in step S2 of FIG. 12A. When the third sensor 43 has not detected the bonding portion A of the two-ply sheet PJ (NO in step S2 of FIG. 12A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 12A), in response to the timing of detection of the bonding portion A of the two-ply sheet PJ by the third sensor 43, the controller 500 causes the third conveyance roller pair 6 to convey the two-ply sheet PJ in the forward direction by a predetermined amount X1, in step S3 of FIG. 12A, and stops the conveyance of the two-ply sheet PJ.

Then, as illustrated in FIG. 4C, in response to the temporary stop of the conveyance of the two-ply sheet PJ by the third conveyance roller pair 6, the controller 500 causes the gripper 32 to move from the gripping position to the releasing position, in step S4 of FIG. 12A. In other words, the controller 500 causes the cam 34 to rotate to the position at which the cam 34 presses the arm 31. While the cam 34 presses the arm 31, the gripped portion B of the two-ply sheet PJ can be received between the gripper 32 and the receiving portion 20b of the winding roller 20.

Then, as illustrated in FIG. 4D, the controller 500 causes the third conveyance roller pair 6 to rotate in the reverse direction to start conveyance of the two-ply sheet PJ in the reverse direction in step S5 of FIG. 12A. At this time, the fourth sensor 44 detects the gripped portion B of the two-ply sheet PJ (i.e., the one end of the two-ply sheet PJ, in other words, the leading end of the two-ply sheet PJ conveyed in the reverse direction) to convey the gripped portion B of the two-ply sheet PJ to the gripping position of the winding roller 20.

Subsequently, the controller 500 determines whether the fourth sensor 44 has detected the gripped portion B of the two-ply sheet PJ, in step S6 of FIG. 12A. When the fourth sensor 44 has not detected the gripped portion B (NO in step S6 of FIG. 12A), step S6 is repeated until the fourth sensor 44 detects the gripped portion B of the two-ply sheet PJ. By contrast, when the fourth sensor 44 has detected the gripped portion B (YES in step S6 of FIG. 12A), as illustrated in FIG. 5A, in response to the detection of the gripped portion B of the two-ply sheet PJ by the fourth sensor 44, the controller 500 causes the third conveyance roller pair 6 to convey the two-ply sheet PJ by a predetermined amount X2 until the gripped portion B of the two-ply sheet PJ reaches the predetermined rotational position of the winding roller 20, in other words, the winding start position W (see FIG. 2). Then, the controller 500 causes the third conveyance roller pair 6 to stop the conveyance of the two-ply sheet PJ, in step S7 of FIG. 12A.

Then, as illustrated in FIG. 5B, the gripper 32 is moved from the releasing position to the gripping position while the gripped portion B of the two-ply sheet PJ is at the predetermined rotational position of the winding roller 20 (i.e., the winding start position W), in step S8 of FIG. 12A. In other words, the controller 500 causes the cam 34 to rotate to the position at which the cam 34 does not press the arm 31. While the cam 34 is at the position, as illustrated in FIG. 5B', the end face of the one end of the two-ply sheet PJ does not contact any member, and the gripped portion B of the two-ply sheet PJ is gripped between the gripper 32 and the receiving portion 20b of the winding roller 20. The winding start position W illustrated in FIG. 2 is the predetermined position of the outer circumferential face of the winding roller 20 at the predetermined rotational position of the winding roller 20. However, at the releasing position in FIG. 5A and the gripping position in FIG. 5B, the outer circumferential face of the winding roller 20 does not exist. For this reason, the winding start position W is a position on a theoretical outer circumferential face of the winding roller 20.

Then, as illustrated in FIG. 5C, the winding roller 20 rotates in the reverse direction (that is, the counterclockwise direction in the drawing) while the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ in the area between the winding roller 20 and the third conveyance roller pair 6, as illustrated in FIG. 5D. As the gap C is formed, the first guide 25 and the second guide 26 limit the warp (slack) of the two-ply sheet PJ in the vicinity of the winding roller 20. As a result, the gap C of the two-ply sheet PJ is intensively formed near the third conveyance roller pair 6.

As described above, the leading end of the two-ply sheet PJ in the reverse direction is detected by the fourth sensor 44 that is disposed between the third conveyance roller pair 6 and the winding roller 20 and downstream from the third conveyance roller pair 6 in the reverse direction. Since the controller 500 determines the timing at which the gripper 32 and the receiving portion 20b grip the gripped portion B of the two-ply sheet PJ in response to the timing of detection of the leading end of the two-ply sheet PJ conveyed in the reverse direction by the fourth sensor 44, the gripped portion B of the two-ply sheet PJ can be accurately conveyed to a desired gripping position regardless of variations in the sheet lengths with respect to the sheet conveyance amount X2 as the predetermined amount X2. Note that the size of sheets includes an error even if the sheets are sold as the same size. Further, the fourth sensor 44 is disposed between the third conveyance roller pair 6 and the winding roller 20 at the position proximate to the winding roller 20. By so doing, the sheet conveyance amount X2 from the detection of the leading end of the two-ply sheet PJ in the reverse direction is reduced regardless of the sheet length. As a result, the above-described configuration can reduce variation in the sheet conveyance amount X2 (i.e., the predetermined amount X2) and can accurately convey the gripped portion B of the two-ply sheet PJ to the desired gripping position.

Accordingly, the fourth sensor 44 is preferably disposed near the winding roller 20.

Then, the controller 500 causes the third conveyance roller pair 6 and the winding roller 20 to rotate in the reverse direction, as illustrated in FIG. 5D. At the timing at which the third conveyance roller pair 6 has conveyed the two-ply sheet PJ by a conveyance amount that is equal to a predetermined amount X3 since the start of winding of the two-ply sheet PJ by the winding roller 20, the controller 500 causes the third conveyance roller pair 6 to stop the conveyance of the two-ply sheet PJ and the winding roller 20 to stop the winding the two-ply sheet PJ, as illustrated in FIG. 6A, in step S9 of FIG. 12A. While the conveyance and winding of the two-ply sheet PJ are stopped, the two-ply sheet PJ is wound around the winding roller 20 one or more times, and the gap C in the two-ply sheet PJ (i.e., the distance between the first sheet P1 and the second sheet P2 in the vertical direction) is sufficiently widened.

In other words, the bonding portion A of the two-ply sheet PJ is nipped by the third conveyance roller pair 6.

As a result, as illustrated in FIG. 6B, the controller 500 causes the separation claws 16 to move to be inserted into the gap C that is sufficiently widened in the two-ply sheet PJ, as illustrated in FIG. 6B, in step S10 of FIG. 12A. In other words, as illustrated in FIGS. 9 and 10A, each of the separation claws 16 in pair is moved from the standby position in FIG. 10A to the separation position in FIG. 10B.

Then, as illustrated in FIG. 6C, the third conveyance roller pair 6 and the winding roller 20 start rotating in the forward direction, in other words, in the clockwise direction while the separation claws 16 are inserted in the gap C, in step S11 of FIG. 12A.

At this time, when the winding roller 20 can convey the two-ply sheet PJ along with rotation of the winding roller 20 in the forward direction (clockwise direction), the bonding portion A of the two-ply sheet PJ may not be nipped by the third conveyance roller pair 6. In other words, as the winding roller 20 rotates in the forward direction, the bonding portion A of the two-ply sheet PJ may be conveyed toward the third conveyance roller pair 6. Then, the third conveyance roller pair 6 may convey the two-ply sheet PJ while nipping the bonding portion A of the two-ply sheet PJ.

Then, as illustrated in FIG. 7A, after the third conveyance roller pair 6 has conveyed the two-ply sheet PJ in the forward direction by a predetermined amount X4, the controller 500 causes the third conveyance roller pair 6 and the winding roller 20 to stop rotating in the forward direction, in step S12 of FIG. 12B. At this time, the two-ply sheet PJ is not wound around the gripper 32 and the gripper 32 can release the gripping of the gripped portion B of the two-ply sheet PJ at the winding start position W. In other words, at the winding start position W, the gripper 32 can move from the gripping position at which the gripper 32 grips the gripped portion B of the two-ply sheet PJ to the releasing position.

Then, the gripper 32 is moved from the gripping position to the releasing position while the two-ply sheet PJ is not wound around the gripper 32, so that the gripper 32 is on the third sheet conveyance passage K3, in step S13 of FIG. 12B. In other words, the cam 34 rotates as illustrated in FIG. 2B to move to the position at which the cam 34 presses the arm 31. While the cam 34 is at this position, the gripper 32 releases the two-ply sheet PJ from the gripping. In the present embodiment, the cam 34 in the moving mechanism 30 moves to release the gripping of the two-ply sheet PJ by the gripper 32. However, when the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 can be released by pulling the two-ply sheet PJ from the gripper 32 due to conveyance of the two-ply sheet PJ by the third conveyance roller pair 6 without moving the cam 34 in the moving mechanism 30.

Then, as illustrated in FIG. 7B, the controller 500 causes the third conveyance roller pair 6 to rotate in the forward direction again to start conveyance of the two-ply sheet PJ in the forward direction, in step S14 of FIG. 12B. In response to the start of the conveyance of the two-ply sheet PJ in the forward direction, the fourth sensor 44 detects the gripped portion B of the two-ply sheet PJ, i.e., the one end of the two-ply sheet PJ and the trailing end of the two-ply sheet PJ conveyed in the forward direction. In addition, after the gripped portion B of the two-ply sheet PJ, i.e., the one end of the two-ply sheet PJ and the trailing end of the two-ply sheet PJ in the forward direction, passes over the switching claws 15, the gripper 32 is moved from the releasing position to the gripping position and the switching claws 15 are rotated in the clockwise direction from the standby position to the switching position. Then, as illustrated in FIG. 7B, when the gripped portion B, i.e., the trailing end of the two-ply sheet PJ conveyed in the forward direction reaches near the separation claws 16, the trailing ends of the first sheet P1 and the second sheet P2 of the two-ply sheet PJ are separated and largely opened.

Then, the controller 500 determines whether the third conveyance roller pair 6 conveys the two-ply sheet PJ by a predetermined amount X5 in response to the timing at which the fourth sensor 44 detects the trailing end of the two-ply sheet PJ conveyed in the forward direction, in other words, after the fourth sensor 44 has detected the gripped portion B of the two-ply sheet PJ, in step S15 of FIG. 12B. When the third conveyance roller pair 6 does not convey the two-ply sheet PJ by the predetermined amount X5 after the fourth sensor 44 has detected the gripped portion B of the two-ply sheet PJ (NO in step S15 of FIG. 12B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 12B), as illustrated in FIG. 12D, the controller 500 causes the third conveyance roller pair 6 to stop conveying the two-ply sheet PJ and causes the separation claws 16 to move in the reverse direction to start conveyance of the two-ply sheet PJ in the reverse direction, as illustrated in FIG. 7C, in step S16 of FIG. 12B. At this time, since the free ends of the switching claws 15 are located at the switching position where the entry of the two-ply sheet PJ into the third sheet conveyance passage K3 is blocked, the two sheets, in other words, the first sheet P1 and the second sheet P2 separated from each other are guided to the first branched sheet conveyance passage K4 and the second branched sheet conveyance passage K5, respectively, as illustrated in FIG. 7C. At this time, the fifth sensor 45 (see FIG. 1) detects the bonding portion A of the two-ply sheet PJ (i.e., the other end of the two-ply sheet PJ and the trailing end of the two-ply sheet PJ conveyed in the reverse direction) so as to convey and stop the two-ply sheet PJ while the third conveyance roller pair 6 nips the portion near the bonding portion A of the two-ply sheet PJ.

Subsequently, as illustrated in FIG. 8A, the controller 500 determines whether the fifth sensor 45 (see FIG. 1) has detected the trailing end of the two-ply sheet PJ in the reverse direction, in step S17 of FIG. 12B. When the fifth sensor 45 has not detected the trailing end of the two-ply sheet PJ in the reverse direction (NO in step S17 of FIG. 12B), step S17 is repeated until the fifth sensor 45 detects the trailing end of the two-ply sheet PJ in the reverse direction. By contrast, when the fifth sensor 45 has detected the trailing end of the two-ply sheet PJ in the reverse direction (YES in step S17 of FIG. 12B), the controller 500 causes the third conveyance roller pair 6 to convey the two-ply sheet PJ by a predetermined amount X6 and to stop the conveyance of the two-ply sheet PJ when the two-ply sheet PJ has been conveyed by the predetermined amount X6, in step S18 of FIG. 12B. At this time, the bonding portion A of the two-two-ply sheet PJ is at the nipping position of the third conveyance roller pair 6 or a position slightly left and downstream from the nip region in the forward direction. In other words, the other end of the two-ply sheet PJ is nipped by the third conveyance roller pair 6.

Then, as illustrated in FIG. 8A, the controller 500 starts to convey the inner sheet PM from the second feed tray 12 (see FIG. 1), in step S19 of FIG. 12B. At this time, the third sensor 43 detects the leading end of the inner sheet PM (i.e., the other end of the inner sheet PM and the leading end in the forward direction). In addition, as illustrated in FIG. 8B, the separation claws 16 move to the respective standby positions.

Subsequently, as illustrated in FIG. 8C, the controller 500 determines whether the third sensor 43 has detected the leading end of the inner sheet PM in the forward direction, in step S20 of FIG. 12B. When the third sensor 43 has not detected the leading end of the inner sheet PM in the forward direction (NO in step S20 of FIG. 12B), step S20 is repeated until the third sensor 43 detects the leading end of the inner sheet PM in the forward direction. By contrast, when the third sensor 43 has detected the leading end of the inner sheet PM in the forward direction (YES in step S20 of FIG. 12B), in response to the detection of the leading end of the inner sheet PM, in other words, the leading end in the forward direction, the controller 500 causes the second conveyance roller pair 5 to convey the inner sheet PM by a predetermined amount X7. Then, the controller 500 causes the third conveyance roller pair 6 to start conveying the two-ply sheet PJ in the forward direction again, in step S21 of FIG. 12B. At this time, the inner sheet PM is accurately nipped at a desired position between the first sheet P1 and the second sheet P2 of the two-ply sheet PJ.

Thus, the controller 500 finishes the operations to insert the inner sheet PM between the first sheet P1 and the second sheet P2 in the two-ply sheet PJ. The third conveyance roller pair 6 conveys the two-ply sheet PJ in the forward direction with the insertion sheet PM inserted in the two-ply sheet PJ, so that the two-ply sheet PJ with the inner sheet PM is placed on the ejection tray 13 (see FIG. 1).

In the state illustrated in FIG. 6A of the present embodiment, the gap C is formed between the first sheet P1 and the second sheet P2 of the two-ply sheet PJ in the non-bonding portion near the bonding portion A of the two-ply sheet PJ to peel (separate) the two sheets, i.e., the first sheet P1 and the second sheet P2.

By contrast, in the state illustrated in FIG. 6A of the present embodiment, the bonding portion A of the two-ply sheet PJ may be set as the gripped portion B if the two-ply sheet PJ is gripped by the third conveyance roller pair 6 with sufficiently strong force. In other words, in FIGS. 5A, 5B, 5B', 5C, 5C', and 5D, while the bonding portion A of the two-ply sheet PJ is gripped by the gripper 32 and the receiving portion 20b of the winding roller 20, the two-ply sheet PJ is wound around the winding roller 20, and the non-bonding portion is nipped and conveyed by the third conveyance roller pair 6. At this time, the third conveyance roller pair 6 rotates to convey the first sheet P1 and the second sheet P2 of the two-ply sheet PJ in synchronization with each other without slipping. For example, increasing the nip pressure of the third conveyance roller pair 6, using roller material having a large coefficient of friction, or controlling the driving method of the rollers of the third conveyance roller pair 6 reduces occurrence of slippage of the two sheets P1 and P2 (i.e., the first sheet P1 and the second sheet P2). By so doing, a desired gap such as the gap C is formed in the two-ply sheet PJ to peel (separate) the two sheets P1 and P2. The above-described configuration can also reduce the number of times of conveyance of the two-ply sheet PJ until the inner sheet PM is inserted into the two-ply sheet PJ.

Referring now to FIGS. 1, 13, 14A, and 14B, the sheet separation device 1 according to the present embodiment further includes the curved conveyor 36 that functions as a conveyor.

Figure 13:
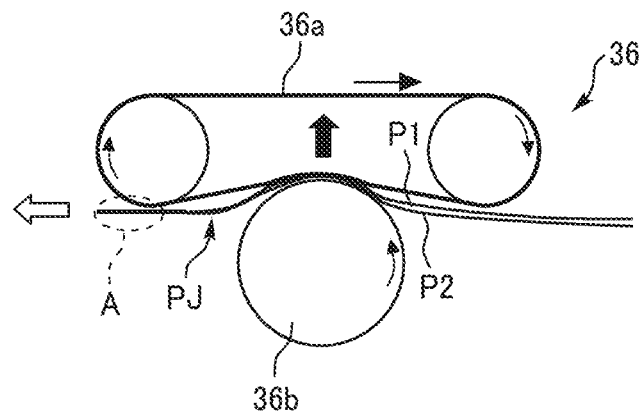
FIG. 13 is a diagram illustrating a curved conveyor.

FIG. 13 is a diagram illustrating the curved conveyor 36.

Figure 14A:
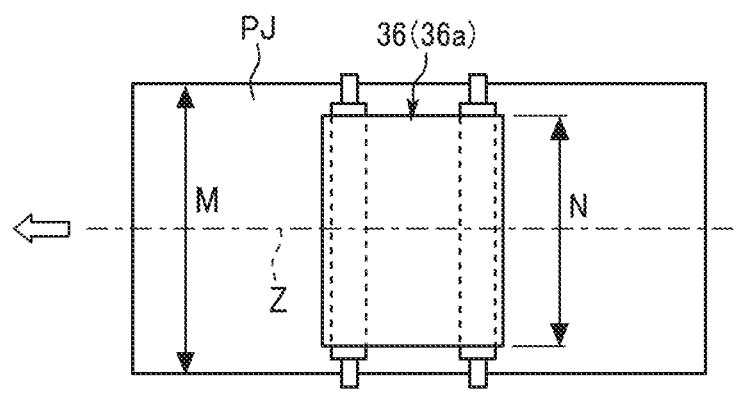
FIGS. 14A and 14B are diagrams illustrating the curved conveyor and the two-ply sheet, along the width direction of the two-ply sheet.
Figure 14B:
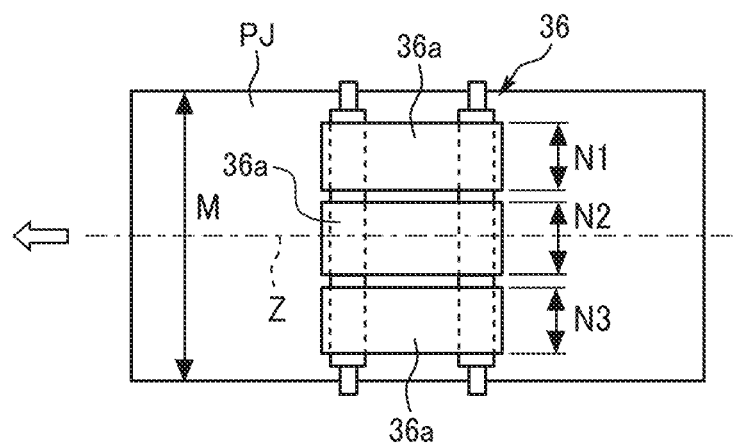

FIGS. 14A and 14B are diagrams illustrating the curved conveyor 36 and the two-ply sheet PJ, along the width direction of the two-ply sheet PJ.

The curved conveyor 36 conveys the two-ply sheet PJ toward the sheet separator 19 (winding roller 20) while bending (warping) the two-ply sheet PJ in the direction intersecting the conveyance direction of the two-ply sheet PJ. The conveyance direction of the two-ply sheet PJ is the direction indicated by white arrow in FIG. 13 and the direction intersecting the conveyance direction of the two-ply sheet PJ is the direction that runs to the left side in FIG. 1, is indicated by black arrow in FIG. 13, and is substantially perpendicular to the sheet face. Specifically, as illustrated in FIG. 13, the curved conveyor 36 serving as a conveyor includes a conveyor belt 36a serving as a belt and a counter roller 36b serving as a roller.

The conveyor belt 36a serving as a belt is stretched and supported by two rollers and is disposed to face the first sheet P1 of the two-ply sheet PJ.

The counter roller 36b serving as a roller contacts and presses the belt face of the conveyor belt 36a (belt) to form a nip region to which the two-ply sheet PJ is conveyed. The belt face is a face of the belt between the two rollers.

These members of the curved conveyor 36 are driven by a driving mechanism and are rotated in respective arrows in FIG. 13.

As illustrated in FIG. 13, the conveyor belt 36a of the curved conveyor 36 is pressed by the counter roller 36b of the curved conveyor 36 to warp (slack) in the direction indicated by black arrow. Due to such a configuration, the nip region curving along the curvature of the counter roller 36b is formed.

The two-ply sheet PJ passes through the nip region of the above-described curved conveyor 36. According to this configuration, even when the first sheet P1 and the second sheet P2 of the two-ply sheet PJ electrostatically adhere to each other with a strong force in the portion other than the bonding portion A (in other words, the non-bonding portion), the sheet separator 19 (see FIG. 1) can preferably separate the first sheet P1 and the second sheet P2 of the two-ply sheet PJ.

Specifically, it is likely that the two-ply sheet PJ is set on the first feed tray 11 while the two sheets P1 and P2 electrostatically attract to each other with a strong force in the portion other than the bonding portion A (in other words, the non-bonding portion). It is also likely that the two sheets P1 and P2 electrostatically adhere to each other with a strong force in the portion other than the bonding portion A (in other words, the non-bonding portion) after the two-ply sheet PJ is set on the first feed tray 11.

Even if the two-ply sheet PJ is wound around the winding roller 20 of the sheet separator 19 while the two sheets P1 and P2 electrostatically adhere to each other as described above, the slack difference between the two sheets P1 and P2 as described with reference to FIG. 5C is hardly formed, and a sufficient gap C into which the separation claws 16 can be inserted is not formed between the two sheets P1 and P2. As a result, the two sheets P1 and P2 of the two-ply sheet PJ fail to be fully separated, and the sheet inserting operation in which the inner sheet PM is inserted to the two-ply sheet PJ can be difficult to be performed due to the defect (separation failure).

By contrast, in the present embodiment, the curved conveyor 36 warps (curves) the two-ply sheet PJ in a direction different from the conveyance direction of the two-ply sheet PJ, in the sheet conveyance passage from the first feed tray 11 to the sheet separator 19. Due to such a configuration, the electrostatic attraction force to the two sheets P1 and P2 can be reduced (weakened). As a result, the separation failure to occur on the two-ply sheet PJ in the sheet separator 19 is reduced.

Figure 16A:
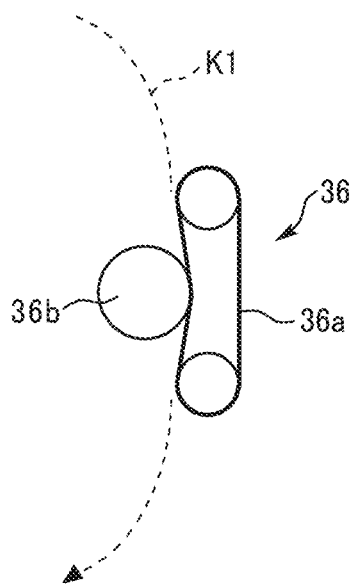
FIGS. 16A and 16B are diagrams illustrating the curved conveyor according to Modification 2 of an embodiment of the present disclosure.
Figure 16B:
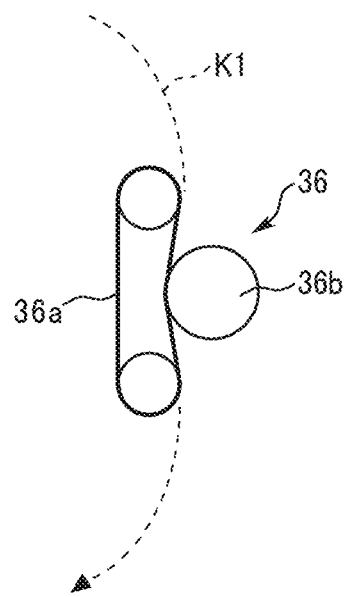

In this embodiment, as illustrated in FIGS. 1 and 16B, the curved conveyor 36 serving as a conveyor is disposed on the curved sheet conveyance passage (i.e., the first sheet conveyance passage K1).

By passing through the curved sheet conveyance passage described above, the two-ply sheet PJ is curved along the curve of the curved sheet conveyance passage, and the electrostatic attraction force of the two sheets P1 and P2 is weakened. By further bending (warping) the two-ply sheet PJ having the weakened electrostatic attraction force by the curved conveyor 36, the attraction force of the two sheets P1 and P2 are more weakened.

In particular, in the present embodiment, the curved conveyor 36 is disposed to warp the two-ply sheet PJ in the reverse direction with respect to the curving direction of the first sheet conveyance passage K1. Due to such a configuration, the two-ply sheet PJ is bent (warped) alternately to the one sheet face and the other sheet face, and the electrostatic attraction force is gradually reduced.

As illustrated in FIG. 14A, in the present embodiment, the curved conveyor 36 serving as a conveyor has a widthwise range N in the width direction that is a direction indicated by white arrow to be orthogonal to the conveyance direction of the two-ply sheet PJ. The widthwise range N is the distance of the nip region in the width direction and covers a distance half or more of a widthwise range M in the width direction of the two-ply sheet PJ of the maximum size conveyable, for example, the A4 lateral (landscape) size sheet.

Specifically, the sheet such as the two-ply sheet PJ or the inner sheet PM is conveyed in the first sheet conveyance passage K1, the second sheet conveyance passage K2, the third sheet conveyance passage K3, the first branched sheet conveyance passage K4, and the second branched sheet conveyance passage K5 in the sheet separation device 1 such that the widthwise center position Z of the sheet is aligned regardless of the size of the sheet. In other words, the sheet is conveyed while the center of the sheet is adjusted as a reference position. The curved conveyor 36 is disposed such that the widthwise center position of the nip region substantially matches with the widthwise center position Z and the widthwise range N covers the distance half or more of the widthwise range M of the two-ply sheet PJ having the maximum size conveyable in the sheet separation device 1.

When the widthwise range N has the distance smaller than half of the widthwise range M, it is less likely to fulfill the function of bending the two-ply sheet PJ by the curved conveyor 36 and reducing the attraction force of the two sheets P1 and P2.

In the present embodiment, since the widthwise range N is half or more of the widthwise range M, it is also easy to fulfill the function of bending the two-ply sheet PJ by the curved conveyor 36 and reducing the attraction force of the two sheets P1 and P2 is sufficiently fulfilled, and the effect of reducing the separation failure of the two-ply sheet PJ.

In the present embodiment, as illustrated in FIG. 14B, the curved conveyor 36 serving as a conveyor may be divided into multiple conveyors in the width direction. The term "divided" indicates the division of the part having the function to warp (curve) the two-ply sheet PJ in the curved conveyor 36.

For example, the curved conveyor 36 illustrated in FIG. 14B has three conveyor belts 36a divided in the width direction. Each of the conveyor belts 36a form a nip region between each conveyor belt 36a and the counter roller 36b. Even when the curved conveyor 36 is divided in the width direction as described above, setting the widthwise range of the curved conveyor 36 (in this case, the sum of the widthwise ranges N1, N2, and N3 of the three conveyor belts 36a) to be the distance half or more of the widthwise range M of the two-ply sheet PJ also sufficiently fulfill the function of bending the two-ply sheet PJ by the curved conveyor 36, which also easily fulfill the effect of reducing the separation failure of the two-ply sheet PJ.

Modification 1

Figure 15A:
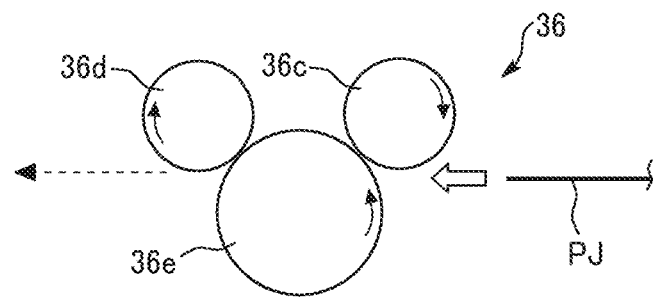
FIGS. 15A and 15B are diagrams illustrating the curved conveyor according to Modification 1 of an embodiment of the present disclosure.
Figure 15B:
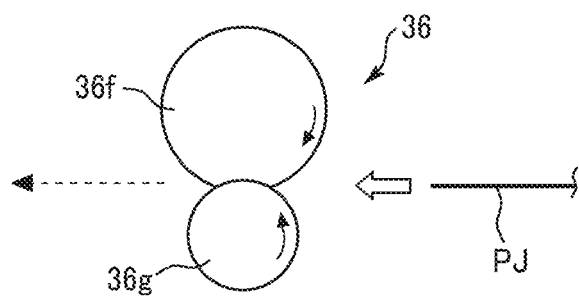

A description is given of a curved conveyor 36 according to Modification 1, with reference to FIGS. 15A and 15B.

FIGS. 15A and 15B are diagrams illustrating the curved conveyor according to Modification 1 of an embodiment of the present disclosure.

As illustrated in FIG. 15A, the curved conveyor 36 serving as a conveyor according to Modification 1 includes two rollers 36c and 36d and a pressure roller 36e. The rollers 36c and 36d face one face of the two-ply sheet PJ at respect positions spaced apart from each other in the conveyance direction of the two-ply sheet PJ indicated by white arrow (and the broken line with arrow). The pressure roller 36e contacts and presses the rollers 36c and 36d to form respective nip regions to nip and convey the two-ply sheet PJ. Due to this configuration of the curved conveyor 36, the two-ply sheet PJ conveyed by the curved conveyor 36 curves (warps) along the curvature of the pressure roller 36e.

The curved conveyor 36 serving as a conveyor illustrated in FIG. 15B includes a roller 36g and a low-elastic roller 36f. The low-elastic roller 36f has the surface elasticity lower than the surface elasticity of the roller 36g and contacts and presses the roller 36g to form a nip region through which the two-ply sheet PJ is conveyed. The surface elasticity is elasticity of the surface layer of a roller such as the roller 36g or the low-elastic roller 36f Due to this configuration of the curved conveyor 36, the two-ply sheet PJ conveyed by the curved conveyor 36 curves (warps) along the curvature of the roller 36g.

Even when the curved conveyor 36 having the above-described configuration such as the curved conveyor 36 illustrated in FIG. 15A or the curved conveyor 36 illustrated in FIG. 15B is employed, the curved conveyor 36 warps (curves) the two-ply sheet PJ in the sheet conveyance passage from the first feed tray 11 to the sheet separator 19. As a result, the curved conveyor 36 weakens the attraction force of the two sheets P1 and P2 and reduces the separation failure of the two-ply sheet PJ in the sheet separator 19.

Modification 2

A description is given of a curved conveyor 36 according to Modification 2, with reference to FIGS. 16A and 16B.

FIGS. 16A and 16B are diagrams illustrating the curved conveyor according to Modification 2 of an embodiment of the present disclosure.

In Modification 2, the curved conveyor 36 serving as a conveyor illustrated in FIG. 16A is different from the curved conveyor 36 illustrated in FIG. 16B and is disposed so as to bend (warp) the two-ply sheet PJ in the same direction as the curving direction of the first sheet conveyance passage K1 that is a curved sheet conveyance passage.

As a result, the two-ply sheet PJ is intensively bent (curved) toward the one sheet face to reduce the attraction force drastically.

The curved conveyor 36 having the above-described configuration can also reduce occurrence of the separation failure of the two-ply sheet PJ in the sheet separator 19.

Modification 3

Figure 17A:
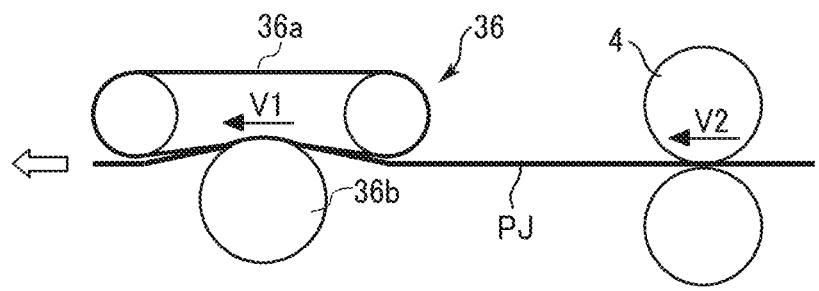
FIGS. 17A and 17B are diagrams illustrating a first conveyor (curved conveyor) and a second conveyor, according to Modification 3 of an embodiment of the present disclosure.
Figure 17B:
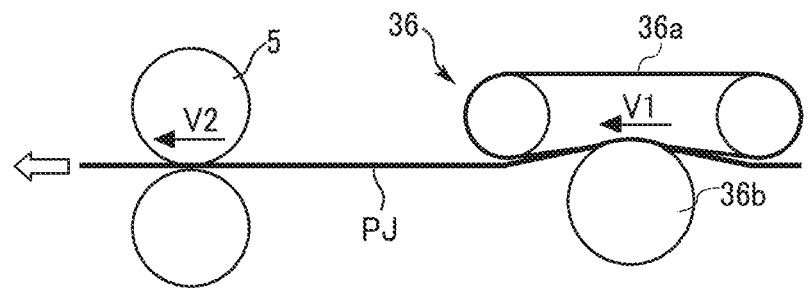

A description is given of a curved conveyor 36 according to Modification 3, with reference to FIGS. 17A and 17B.

FIGS. 17A and 17B are diagrams illustrating a first conveyor (curved conveyor) and a second conveyor, according to Modification 3 of an embodiment of the present disclosure.

As illustrated in FIG. 17A, the sheet separation device 1 according to Modification 3 includes the curved conveyor 36 serving as a first conveyor and the first conveyance roller pair 4 as a second conveyor to convey the two-ply sheet PJ toward the sheet separator 19. The first conveyance roller pair 4 is disposed upstream from the sheet separator 19 (winding roller 20) in the conveyance direction of the two-ply sheet PJ indicated by white arrow and upstream from the curved conveyor 36 (first conveyor) in the conveyance direction of the two-ply sheet PJ.

In Modification 3, a speed difference is generated between a first conveyance speed V1 (linear velocity at the nip region) by the curved conveyor 36 (first conveyor) and a second conveyance speed V2 (linear velocity at the nip region) by the first conveyance roller pair 4 (second conveyor).

For this reason, while the two-ply sheet PJ is nipped between both nip regions (i.e., the nip region of the curved conveyor 36 and the nip region of the first conveyance roller pair 4), force is applied in the conveyance direction of the two-two-ply sheet PJ to the two-ply sheet PJ due to the above-described speed difference so that the two-ply sheet PJ is bent (warped) easily. As a result, the function of reducing the attraction force of the two sheets P1 and P2 by bending (curving) the two-ply sheet PJ by the curved conveyor 36 is more easily fulfilled.

In particular, in Modification 3, of the curved conveyor 36 (first conveyor) and the first conveyance roller pair 4 (second conveyor), the conveyance speed of the downstream conveyor in the conveyance direction of the two-ply sheet PJ is faster than the conveyance speed of the upstream conveyor in the conveyance direction of the two-ply sheet PJ. In other words, the first conveyance speed V1 of the curved conveyor 36 is faster than the second conveyance speed V2 of the first conveyance roller pair 4 (V1>V2). By so doing, while the two-ply sheet PJ is nipped by the nip region of the curved conveyor 36 and the nip region of the first conveyance roller pair 4, the force to pull the two-ply sheet PJ in the conveyance direction of the two-ply sheet PJ is applied due to the above-described speed difference, so that the two-ply sheet PJ is easily bent (warped). As a result, the function of reducing the curved conveyor 36 is more easily fulfilled.

By contrast, the relation of degrees of the first conveyance speed V1 and the second conveyance speed V2 may be controlled to alternately reversed (switched). Specifically, the driving mechanism that drives the curved conveyor 36 is disposed separately from the driving mechanism that drives other conveyance roller pairs and can change the first conveyance speed V1 to be greater or smaller than the second conveyance speed V2 (fixed value) while the two-ply sheet PJ is nipped by the nip region of the curved conveyor 36 and the nip region of the first conveyance roller pair 4. By so doing, while the two-ply sheet PJ is nipped by the nip region of the curved conveyor 36 and the nip region of the first conveyance roller pair 4, the force of pulling the two-ply sheet PJ in the conveyance direction of the two-ply sheet PJ and the force of contracting the two-ply sheet PJ are alternately applied to the two-ply sheet PJ due to the speed difference in which the degrees of the first conveyance speed V1 and the magnitude of the second conveyance speed V2 are alternately changed. As a result, the two-ply sheet PJ is easily bent (warped). As a result, the function of reducing the attraction force of the two sheets P1 and P2 by bending (curving) the two-ply sheet PJ by the curved conveyor 36 is more easily fulfilled.

In the sheet separation device 1 illustrated in FIG. 17B, the second conveyance roller pair 5 is disposed upstream from the sheet separator 19 (winding roller 20) in the conveyance direction of the two-ply sheet PJ and downstream from the curved conveyor 36 (first conveyor) in the conveyance direction of the two-ply sheet PJ. When the second conveyance roller pair 5 serves as a second conveyor, the speed difference is generated between the first conveyance speed V1 of the curved conveyor 36 (first conveyor) and the second conveyance speed V2 of the second conveyance roller pair 5 (second conveyor). By so doing, the similar effect can be achieved.

Modification 4

Figure 18:
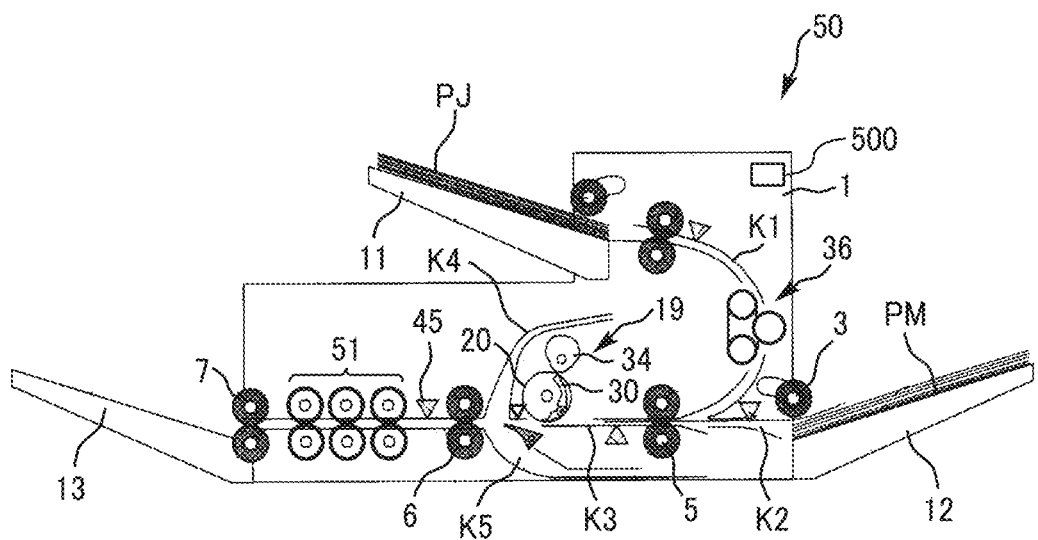
FIG. 18 is a diagram illustrating a sheet laminator according to Modification 4 of an embodiment of the present disclosure.

A description is given of a sheet laminator according to Modification 4, with reference to FIG. 18.

FIG. 18 is a diagram illustrating a sheet laminator according to Modification 4 of an embodiment of the present disclosure.

As illustrated in FIG. 18, a sheet laminator 50 according to Modification 4 includes the sheet separation device 1 illustrated in FIG. 1.

The sheet laminator 50 includes a sheet lamination device 51 disposed downstream from the third conveyance roller pair 6 of the sheet separation device 1 in the forward direction. The sheet lamination device 51 performs a sheet laminating operation on the two-ply sheet PJ in which the inner sheet PM is inserted between the first sheet P1 and the second sheet P2 separated by the sheet separation device 1.

The sheet lamination device 51 includes a plurality of heat-pressure roller pairs, each of which applies heat and pressure to the two-ply sheet PJ while conveying the two-ply sheet PJ in the forward direction with the inner sheet PM being inserted in the two-ply sheet PJ. After the two-ply sheet PJ has passed through the sheet lamination device 51, the entire region of the two-ply sheet PJ is bonded while the inner sheet PM is inserted in the two-ply sheet PJ. Then, the two-ply sheet PJ on which the sheet laminating operation is performed as described above is ejected to the outside of the sheet lamination device 51 by an ejection roller pair 7 and is stacked on the ejection tray 13.

As described above, the sheet laminator 50 according to Modification 4 performs the sheet laminating operation as a sequence of the following operations: an operation to feed the two-ply sheet PJ and the inner sheet PM; an operation to separate the first sheet P1 and the second sheet P2 of the two-ply sheet PJ; an operation to insert the inner sheet PM into the space between the first sheet P1 and the second sheet P2; and an operation to perform the sheet laminating operation on the two-ply sheet PJ inside which the inner sheet PM is inserted. By so doing, the user convenience for the sheet laminator 50 is enhanced.

In particular, once the leading end face of the two-ply sheet PJ is damaged, it is difficult to perform the sheet laminating operation on the damaged leading end face. For this reason, the configuration of the present disclosure is useful.

Since the sheet laminator 50 according to Modification 4 also includes the curved conveyor 36 as a conveyor, the two sheets P1 and P2 of the two-ply sheet PJ can be separated preferably.

Modification 5

Figure 19:
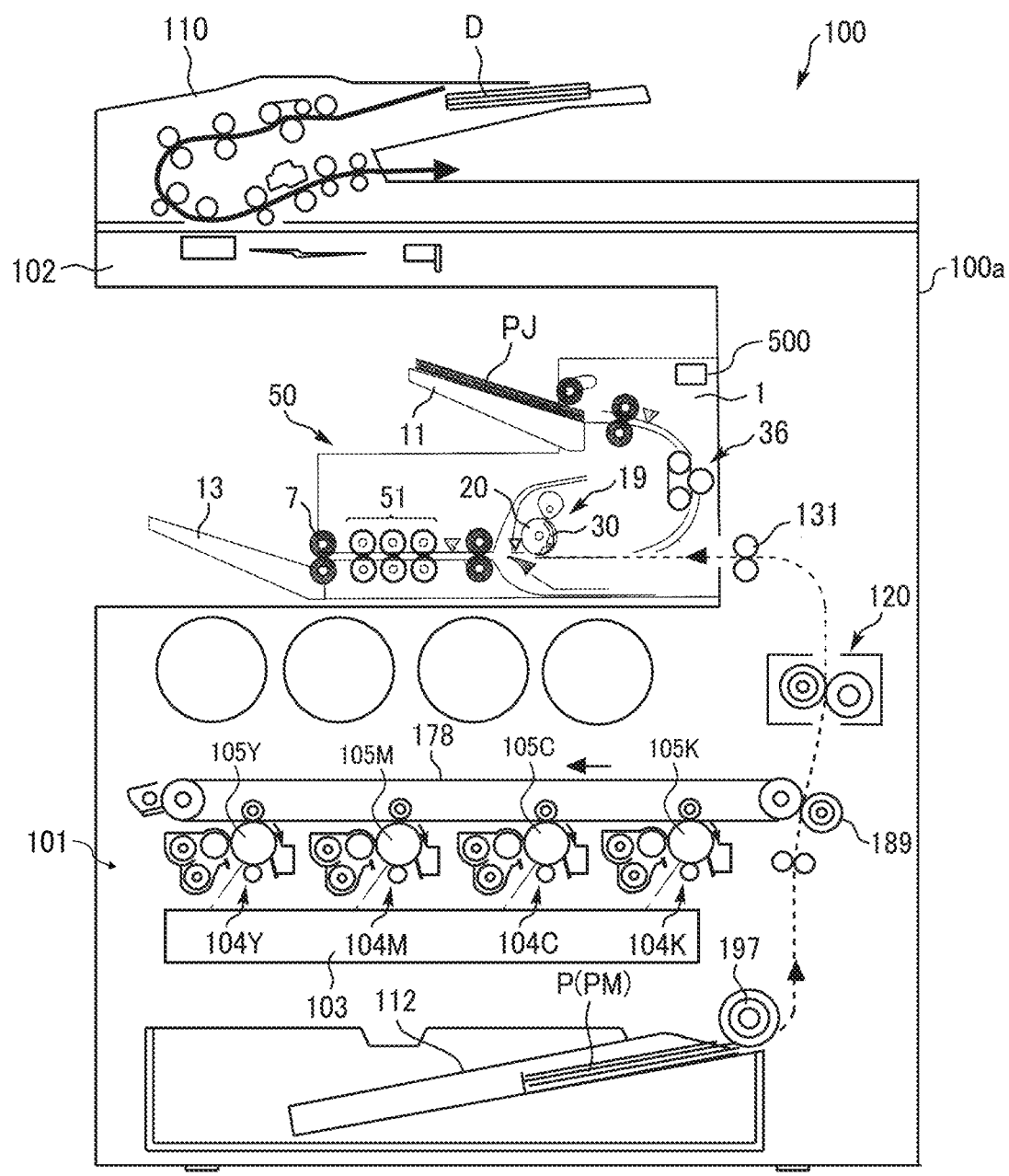
FIG. 19 is a diagram illustrating an image forming apparatus according to Modification 5 of an embodiment of the present disclosure.

A description is given of an image forming apparatus according to Modification 5, with reference to FIG. 19.

FIG. 19 is a schematic view of the image forming apparatus 100, according to Modification 5 of the present embodiment.

As illustrated in FIG. 19, the image forming apparatus 100 according to Modification that forms an image on a sheet P includes the sheet laminator 50 illustrated in FIG. 18, on a housing 100a of the image forming apparatus 100. The housing 100a holds an image forming device 101 that performs an image forming operation in the image forming apparatus 100. The image forming device 101 forms an image on a sheet such as the inner sheet PM.

With reference to FIG. 19, the image forming apparatus 100 further includes a document feeder 110 and a document reading device 102. The document feeder 110 includes multiple pairs of sheet conveying rollers to feed an original document D from a document loading table and convey the original document D in a direction indicated by arrow in FIG. 19. By so doing, the original document D passes over the document reading device 102. At this time, the document reading device 102 optically reads image data of the original document D passing over the document reading device 102.

The image data optically read by the document reading device 102 is converted into electrical signals and transmitted to a writing device 103. The writing device 103 emits laser beams onto photoconductor drums 105Y, 105M, 105C, and 105K, based on the electrical signals of the image data in each of colors, respectively. By so doing, an exposure process is executed by the writing device 103.

After the exposing process is executed, a charging process, the exposure process, and a developing process are executed on the photoconductor drums 105Y, 105M, 105C, and 105K of respective image forming units 104Y, 104M, 104C, and 104K to form desired images on the photoconductor drums 105Y, 105M, 105C, and 105K, respectively.

The images formed on the photoconductor drums 105Y, 105M, 105C, and 105K are then transferred and superimposed onto an intermediate transfer belt 178 to form a color image. The color image formed on the intermediate transfer belt 178 is transferred onto the surface of a sheet P (which is to be the inner sheet PM) fed and conveyed from a feeding device 112 by a feed roller 197 at a position at which the intermediate transfer belt 178 faces a secondary transfer roller 189.

After the color image is transferred onto the surface of the sheet P (that is, the inner sheet PM), the sheet P is conveyed to the position of a fixing device 120. The fixing device 120 fixes the transferred color image formed on the surface of the sheet P, to the sheet P.

The sheet P is then ejected from the housing 100a of the image forming apparatus 100 by an ejection roller pair 131, and is fed as the inner sheet PM, into the sheet laminator 50. The sheet laminator 50 has completed the operations described with reference to FIGS. 4A to 7C (in other words, the operations to separate the two-ply sheet PJ) by the time that the inner sheet PM is fed into the sheet laminator 50 (the sheet separation device 1), and is to perform the operations described with reference to FIGS. 8A to 8C (in other words, the operations to insert the inner sheet PM into the two-ply sheet PJ) after receiving the inner sheet PM. Further, after the sheet lamination device 51 has completed the sheet laminating operation on the two-ply sheet PJ in which the inner sheet PM is inserted, the ejection roller pair 7 ejects the two-ply sheet PJ to the outside of the sheet lamination device 51 to stack the two-ply sheet PJ on the ejection tray 13.

As described above, a series of image forming operations (i.e., the printing operations) in the image forming apparatus 100 and a series of sheet separating operation of the two-ply sheet PJ and the sheet laminating operation of the inner sheet PM on which the image is formed are completed.

In Modification 5, the image forming apparatus 100 includes the sheet laminator 50. Alternatively, the image forming apparatus 100 may include the sheet separation device 1 illustrated in FIG. 1.

Further, the image forming apparatus 100 according to Modification 5 of the present disclosure is a color image forming apparatus but may be a monochrome image forming apparatus. The image forming apparatus 100 according to Modification 5 of the present disclosure employs electrophotography, but the present disclosure is not limited to this configuration. The present disclosure may be applied to other types of image forming apparatuses such as an inkjet image forming apparatus and a stencil printing machine.

Since the sheet laminator 50 provided for the image forming apparatus 100 according to Modification 5 also includes the curved conveyor 36 as a conveyor, the two sheets P1 and P2 of the two-ply sheet PJ can be separated preferably.

Modification 6

Figure 20:
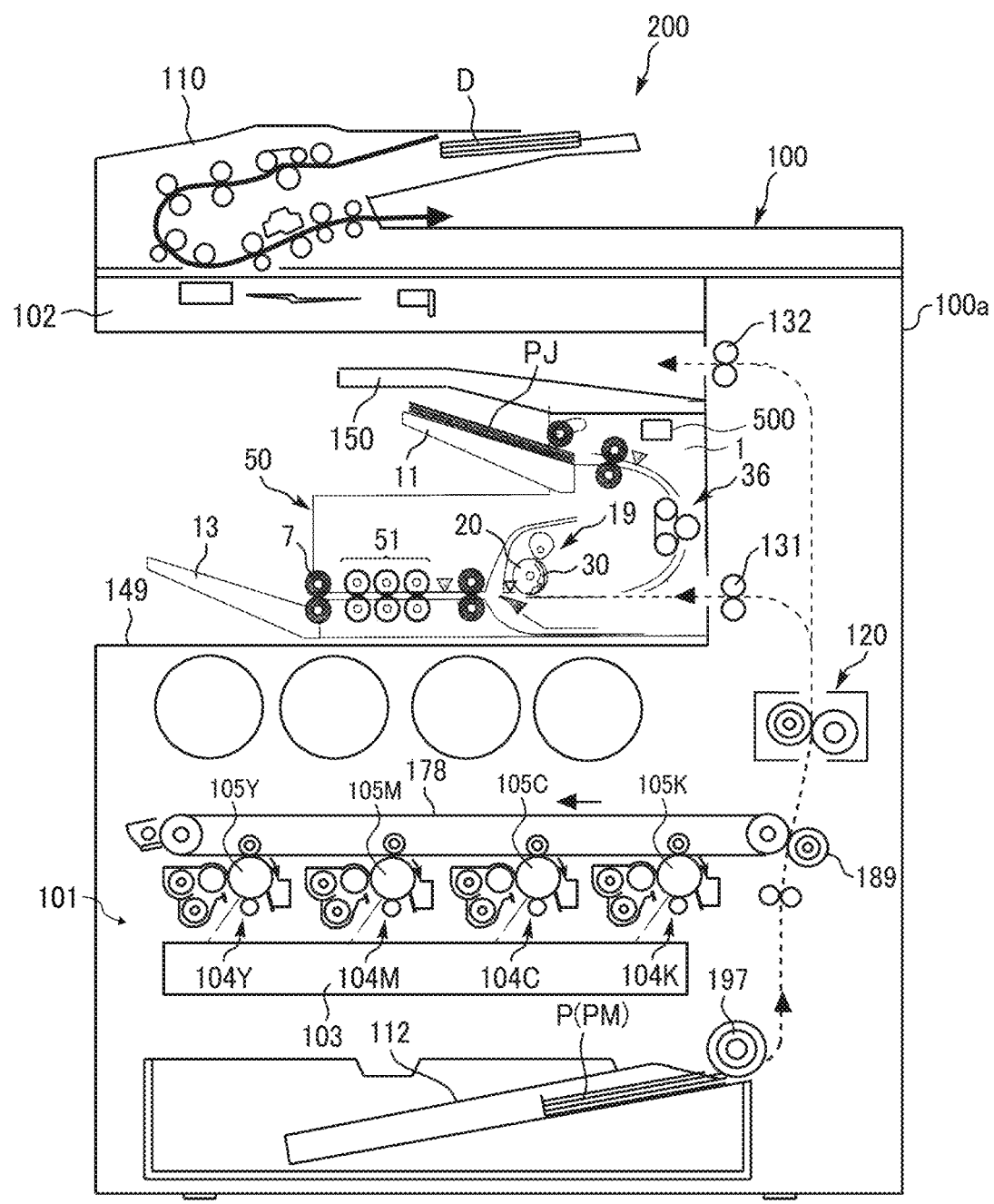
FIG. 20 is a diagram illustrating an image forming system according to Modification 6 of an embodiment of the present disclosure.

A description is given of an image forming system according to Modification 6, with reference to FIG. 20.

FIG. 20 is a diagram illustrating an image forming system according to Modification 6 of an embodiment of the present disclosure.

As illustrated in FIG. 20, an image forming system 200 according to Modification 6 includes the image forming apparatus 100 illustrated in FIG. 19 that forms an image on a sheet P, and the sheet laminator 50 illustrated in FIG. 18 that is detachably attached to the image forming apparatus 100.

In the image forming system 200 illustrated in FIG. 20, the image forming apparatus 100 performs the image forming operations on the sheet P, as described above with reference to FIG. 18. Then, the image forming apparatus 100 ejects the sheet P (that is, the inner sheet PM on which a desired image is formed) by the ejection roller pair 131 from the image forming apparatus 100 to the sheet laminator 50. After the sheet P is conveyed to the sheet laminator 50, the sheet P is inserted into the two-ply sheet PJ, where the sheet laminator 50 performs the sheet laminating operation on the two-ply sheet PJ. Then, the ejection roller pair 7 ejects the two-ply sheet PJ to the outside of the sheet laminator 50 to stack the two-ply sheet PJ on the ejection tray 13.

When a mode in which the above-described sheet laminating operation is not performed is selected, the image forming apparatus 100 of the image forming system 200 according to Modification 6 ejects the sheet P having the image formed in the image forming operations to the outside of the image forming apparatus 100 by a second ejection roller pair 132, so as to stack the sheet P on a second ejection tray 150.

The sheet laminator 50 is detachably attached to the image forming apparatus 100. When the sheet laminator 50 is not used, the sheet laminator 50 may be detached from the image forming apparatus 100. When the sheet laminator 50 is detached from the image forming apparatus 100, a placement surface 149 on which the sheet laminator 50 was installed functions as an ejection tray. For example, when the sheet P is ejected from the ejection roller pair 131 to the outside of the image forming apparatus 100, the placement surface 149 stacks the sheet P on which a desired image is formed.

In Modification 6, the sheet laminator 50 is detachably attached to the image forming system 200. However, the sheet separation device 1 illustrated in FIG. 1 may be detachably attached to the image forming system 200.

Since the sheet laminator 50 provided for the image forming system 200 according to Modification 6 also includes the curved conveyor 36 as a conveyor, the two sheets P1 and P2 of the two-ply sheet PJ can be separated preferably.

In the image forming system 200 according to Modification 6, the sheet laminator 50 is detachably attached to the image forming apparatus 100, in the space under the document feeder 110.

A description is given of an image forming system according to another embodiment of the present disclosure.

Figure 21A:
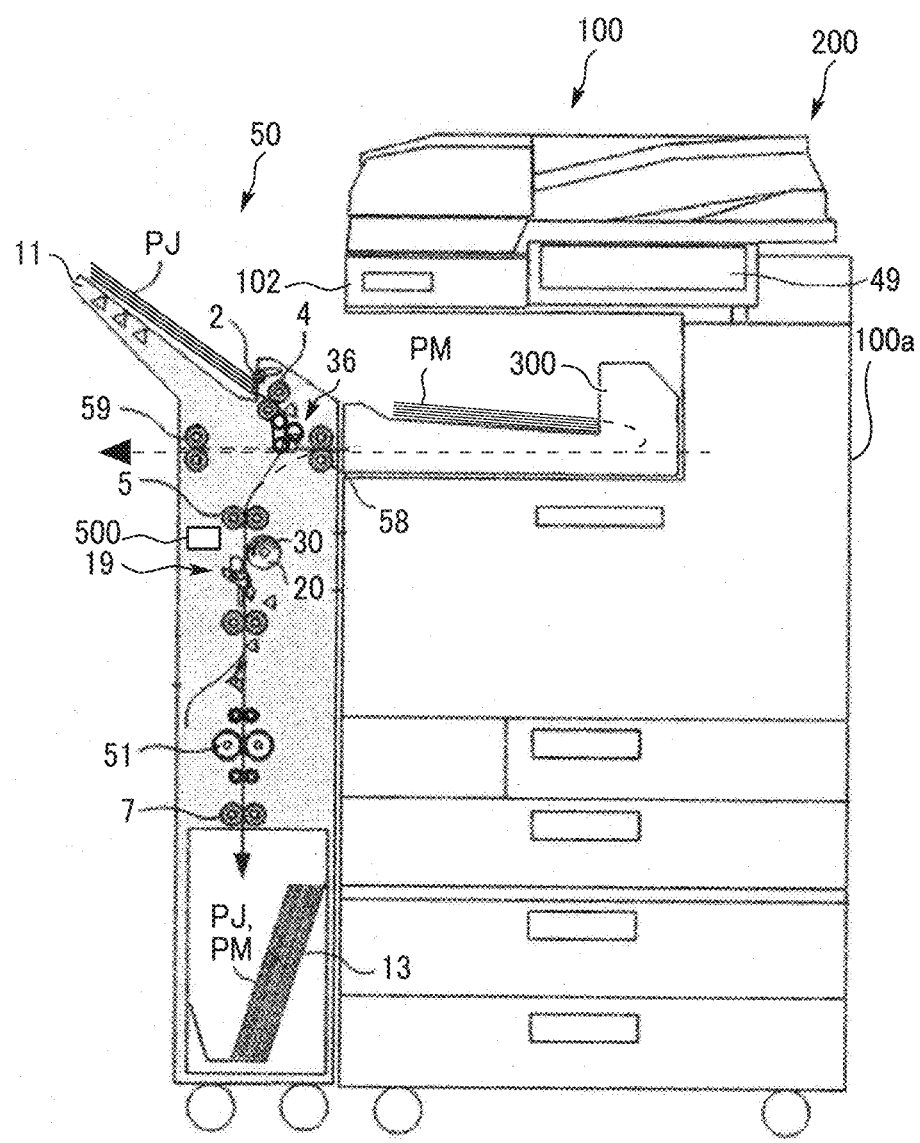
FIG. 21A is a schematic view of an image forming system, according to another embodiment of the present disclosure.

FIG. 21A is a schematic view of an image forming system according to another embodiment of the present disclosure.

As the image forming system 200 illustrated in FIG. 21A, the sheet laminator 50 may be detachably attached adjacent to the image forming apparatus 100, in other words, the sheet laminator 50 may be detachably attached to the image forming apparatus 100 on the side to which the sheet P having an image on the surface is ejected. In such a configuration of the sheet laminator 50, the first feed tray 11 on which the two-ply sheets PJ are stacked, the sheet separator 19 (winding roller 20), the sheet lamination device 51, and the ejection tray 13 are sequentially disposed in this order from top to bottom in the vertical direction. In addition to the sheet conveyance passage for guiding the inner sheet PM ejected from the image forming apparatus 100 to the sheet separator 19 (winding roller 20), the sheet laminator 50 may be provided with another sheet conveyance passage (defined by sheet conveying roller pairs 58 and 59) for ejecting the sheet P ejected from the image forming apparatus 100 without performing the sheet laminating operation on the sheet P.

The sheet laminator 50 may also be provided with a relay device 300 that guides the sheet P (including the inner sheet PM) ejected from the image forming apparatus 100. In this case, the inner sheet PM may be fed from the relay device 300.

Figure 21B:
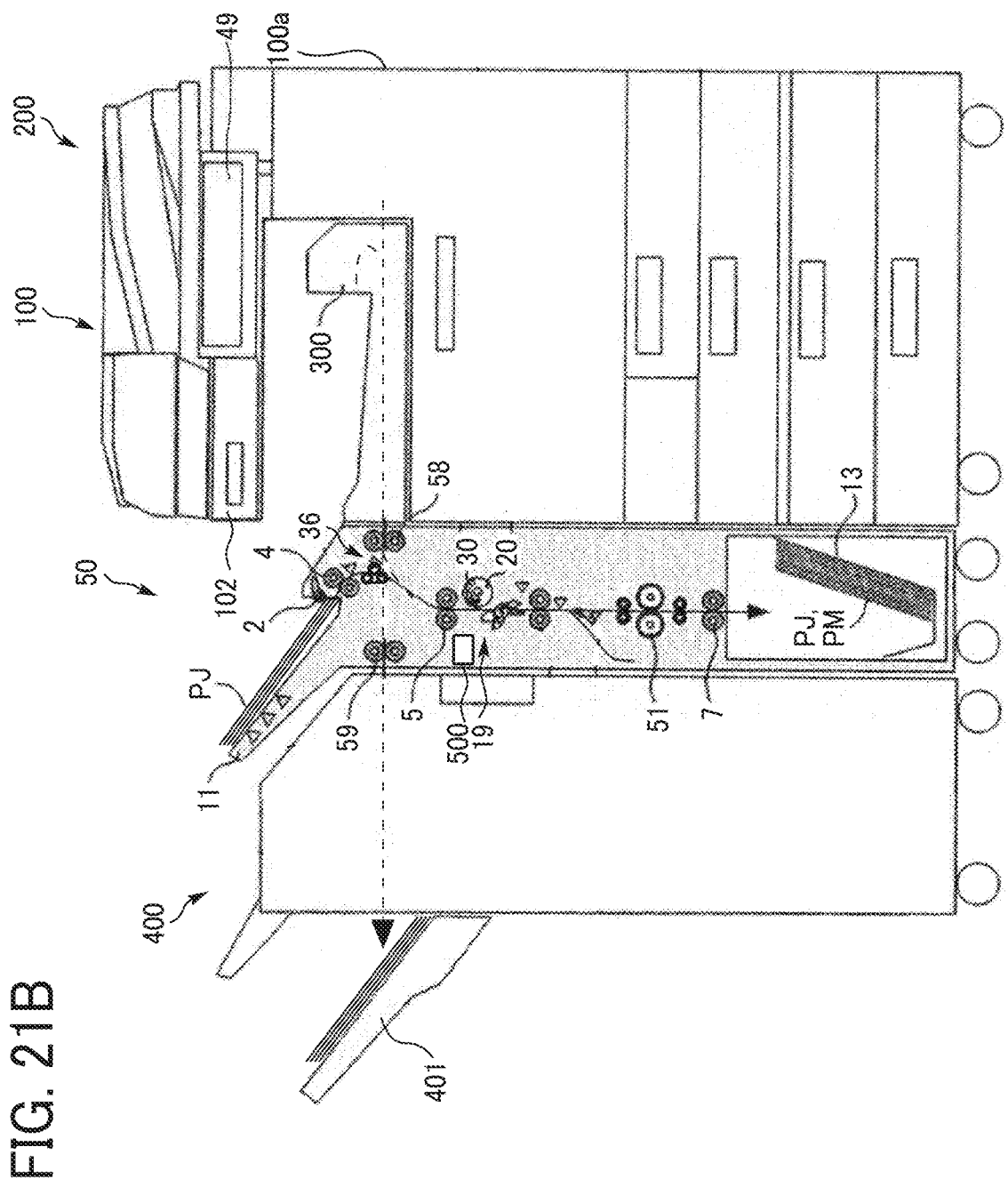
FIG. 21B is a schematic view of an image forming system, according to yet another embodiment of the present disclosure.

Further, FIG. 21B is a schematic view of the image forming system 200 according to yet another embodiment of the present disclosure.

As the image forming system 200 illustrated in FIG. 21B, a post-processing apparatus 400 may be provided to perform the post-processing operations including the punching operation and the stapling operation, on the sheet P ejected from the image forming apparatus 100 through the sheet laminator 50 (in other words, the sheet P without the sheet laminating operation).

As described above, the sheet separation device 1 according to the present embodiment includes the sheet separator 19 that separates the non-bonding portion of the two-ply sheet PJ in which two sheets, which are the first sheet P1 and the second sheet P2, are overlapped and bonded together at the bonding portion A of the two-ply sheet PJ. Further, the sheet separation device 1 further includes the curved conveyor 36 (conveyor) to convey the two-ply sheet PJ toward the sheet separator 19 while bending the two-ply sheet PJ in the direction intersecting the conveyance direction of the two-ply sheet PJ.

As a result, the above-described configuration efficiently separates the first sheet P1 and the second sheet P2 of the two-ply sheet PJ.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet separation device comprising:
   a sheet separator configured to separate a non-bonding portion of a two-ply sheet in which two sheets are overlapped and bonded together at a bonding portion of the two-ply sheet;
   a first conveyor upstream of the sheet separator, the first conveyor configured to,
      convey the two-ply sheet toward the sheet separator while bending the two-ply sheet in a direction that intersects a conveyance direction of the two-ply sheet, and
      convey the two-ply sheet toward the sheet separator while bending the two-ply sheet such that the two-ply sheet includes a first curved portion where a first face of the two-ply sheet is bent outward and defines a first convex shape and a second curved portion where a second face of the two-ply sheet opposite to the first face is bent outward and defines a second convex shape; and
   a second conveyor including at least two rollers, upstream from the sheet separator in the conveyance direction of the two-ply sheet, and upstream from the first conveyor in the conveyance direction of the two-ply sheet, the second conveyor configured to convey the two-ply sheet toward the sheet separator.

2. The sheet separation device according to claim 1, wherein the first conveyor includes:
   a belt; and
   a roller configured to press a belt face of the belt to form a nip region between the belt face of the belt and the roller, the two-ply sheet being conveyed through the nip region.

3. The sheet separation device according to claim 1, wherein the first conveyor includes:
   at least two rollers facing a surface of the two-ply sheet at positions spaced from each other in the conveyance direction of the two-ply sheet; and
   a pressure roller configured to press the at least two rollers to form nip regions through which the two-ply sheet is to be conveyed.

4. The sheet separation device according to claim 1, wherein the first conveyor includes:
   a first roller; and
   a second roller having a surface elasticity lower than a surface elasticity of the first roller,
      the second roller configured to press the first roller to form a nip region through which the two-ply sheet is conveyed.

5. The sheet separation device according to claim 1, wherein the first conveyor has a first widthwise range in a direction orthogonal to the conveyance direction of the two-ply sheet, and
wherein the first widthwise range covers a distance half or more of a second widthwise range of the two-ply sheet.

6. The sheet separation device according to claim 1, wherein the first conveyor includes a plurality of belts divided in a width direction orthogonal to the conveyance direction of the two-ply sheet.

7. The sheet separation device according to claim 1, further comprising:
   a third conveyor upstream from the sheet separator in the conveyance direction of the two-ply sheet and downstream from the first conveyor in the conveyance direction of the two-ply sheet, the third conveyor being configured to convey the two-ply sheet toward the sheet separator; and
   circuitry configured to:
      cause the first conveyor to convey the two-ply sheet at a first conveyance speed; and
      cause the second conveyor and the third conveyor to convey the two-ply sheet at a second conveyance speed different from the first conveyance speed.

8. The sheet separation device according to claim 7, wherein the circuitry is further configured to:
   cause the second conveyor in the conveyance direction to convey the two-ply sheet at a conveyance speed; and
   cause the third conveyor in the conveyance direction to convey the two-ply sheet at a faster conveyance speed than the conveyance speed of the second conveyor.

9. The sheet separation device according to claim 1, wherein the first conveyor is disposed on a curved sheet conveyance passage.

10. The sheet separation device according to claim 1, further comprising:
    circuitry configured to control sheet conveyance of the two-ply sheet,
       wherein the sheet separator includes:
          a winding roller configured to rotate in a given rotation direction to wind the two-ply sheet; and
          a separator configured to be inserted into a gap between the two sheets of the two-ply sheet, the separator being between the winding roller and the second conveyor, and
       wherein the circuitry is configured to cause the sheet separator to perform:
          a sheet separating operation to separate the non-bonding portion of the two-ply sheet; and
          a sheet inserting operation to insert an inner sheet between the two sheets separated from each other by the sheet separating operation.

11. A sheet laminator comprising:
    the sheet separation device according to claim 1; and
    a sheet lamination device configured to perform a sheet laminating operation on the two-ply sheet in which an inner sheet is inserted between the two sheets separated from each other by the sheet separation device.

12. An image forming apparatus comprising:
an image forming device configured to form an image on a sheet; and
the sheet laminator according to claim 11.

13. An image forming system comprising:
an image forming apparatus configured to form an image on a sheet; and
the sheet laminator according to claim 11, the sheet laminator being detachably attached to the image forming apparatus.

14. An image forming apparatus comprising:
an image forming device configured to form an image on a sheet; and
the sheet separation device according to claim 1.

15. An image forming system comprising:
an image forming apparatus configured to form an image on a sheet; and
the sheet separation device according to claim 1, the sheet separation device being detachably attached to the image forming apparatus.

16. The sheet separation device according to claim 1, further comprising:
two guide plates facing each other and defining a curved sheet conveyance passage therebetween, the curved sheet conveyance passage being upstream from the sheet separator in the conveyance direction, wherein each of the two guide plates is curved and the two guide plates collectively define a curved portion of the curved sheet conveyance passage, the curved portion being curved along the conveyance direction, and
the curved portion is configured to curve the two-ply sheet.

17. The sheet separation device according to claim 1, further comprising:
two guide plates facing each other and defining a curved sheet conveyance passage therebetween, the curved sheet conveyance passage being upstream from the sheet separator in the conveyance direction, wherein each of the two guide plates is curved and the two guide plates collectively define a curved portion of the curved sheet conveyance passage, the curved portion being curved along the conveyance direction, and
the first conveyor is configured to receive the two-ply sheet conveyed via the curved sheet conveyance passage and is configured to curve the two-ply sheet in a direction opposite to a direction in which the two-ply sheet is curved by the curved portion.

18. The sheet separation device according to claim 1, wherein
the first conveyor includes a belt wound around at least two rollers in the conveyance direction, and a roller between the at least two rollers in the conveyance direction and in contact with the belt to form a nip, and
the first curved portion and the second curved portion of the two-ply sheet are in the nip and a curved portion of the belt downstream or upstream from the nip in the conveyance direction.

19. A sheet separation device comprising:
a sheet separator configured to separate a non-bonding portion of a two-ply sheet in which two sheets are overlapped and bonded together at a bonding portion of the two-ply sheet;
a first conveyor configured to convey the two-ply sheet toward the sheet separator while bending the two-ply sheet in a direction that intersects a conveyance direction of the two-ply sheet;
a second conveyor upstream from the sheet separator in the conveyance direction of the two-ply sheet and upstream or downstream from the first conveyor in the conveyance direction of the two-ply sheet, the second conveyor being configured to convey the two-ply sheet toward the sheet separator; and
circuitry configured to:
cause the first conveyor to convey the two-ply sheet at a first conveyance speed; and
cause the second conveyor to convey the two-ply sheet at a second conveyance speed different from the first conveyance speed,
wherein the circuitry is configured to alternately reverse a relation of degrees of the first conveyance speed and the second conveyance speed.

* * * * *